(12) United States Patent
Chopra et al.

(10) Patent No.: US 8,702,223 B2
(45) Date of Patent: Apr. 22, 2014

(54) INFRARED-ABSORBING RADIATION-CURABLE INKS

(75) Inventors: Naveen Chopra, Oakville (CA);
Gabriel Iftime, Mississauga (CA);
Michelle N Chrétien, Mississauga (CA);
Barkev Keoshkerian, Thornhill (CA);
Daryl W Vanbesien, Burlington (CA);
Martin E Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 549 days.

(21) Appl. No.: 12/976,286

(22) Filed: Dec. 22, 2010

(65) Prior Publication Data

US 2012/0162333 A1 Jun. 28, 2012

(51) Int. Cl.
*B41J 2/01* (2006.01)
(52) U.S. Cl.
USPC ................................. 347/102; 347/99; 347/88

(58) Field of Classification Search
USPC ......... 347/88, 99, 101, 102, 100, 95, 96, 103; 106/31.13, 31.27, 31.6; 523/160, 161
See application file for complete search history.

(56) References Cited

U.S. PATENT DOCUMENTS

| | | | | |
|---|---|---|---|---|
| 4,767,571 | A * | 8/1988 | Suzuki et al. | 252/587 |
| 2003/0190555 | A1 * | 10/2003 | Nagase | 430/302 |
| 2004/0259027 | A1 * | 12/2004 | Munnelly et al. | 430/270.1 |
| 2006/0275698 | A1 * | 12/2006 | Nguyen et al. | 430/270.1 |
| 2007/0123723 | A1 * | 5/2007 | Odell et al. | 554/36 |
| 2008/0090928 | A1 | 4/2008 | Iftime et al. | |
| 2008/0220187 | A1 | 9/2008 | Iftime et al. | |

* cited by examiner

*Primary Examiner* — Manish S Shah
(74) *Attorney, Agent, or Firm* — Marylou J. Lavoie

(57) ABSTRACT

Disclosed is an ink composition including: (a) a phase change ink carrier which has at least one curable monomer, oligomer, or prepolymer; (b) an initiator; (c) an infrared-absorbing taggant; and (d) an optional colorant, the ink being curable upon exposure to radiation, the ink absorbing radiation in the infrared region.

22 Claims, 1 Drawing Sheet

INFRARED-ABSORBING RADIATION-CURABLE INKS

BACKGROUND

Disclosed herein are curable inks and methods for the use thereof. More specifically, disclosed herein are inks that are curable upon exposure to actinic radiation and that absorb radiation in the infrared region.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Radiation curable inks generally comprise at least one curable monomer, a colorant, and a radiation activated initiator that initiates polymerization of curable components of the ink. Radiation-curable inks can be employed in ink jet printing systems. Radiation-curable phase-change inks are known as well, as disclosed in, for example, U.S. Pat. Nos. 7,153,349, 7,259,275, 7,270,408, 7,271,284, 7,276,614, 7,279,506, 7,279,587, 7,293,868, 7,317,122, 7,323,498, 7,384,463, 7,449,515, 7,459,014, 7,531,582, 7,538,145, 7,541,406, 7,553,011, 7,556,844, 7,559,639, 7,563,489, 7,578,587, 7,625,956, 7,632,546, 7,674,842, 7,681,966, 7,683,102, 7,690,782, 7,691,920, 7,699,922, 7,714,040, 7,754,779, 7,812,064, and 7,820,731, the disclosures of each of which are totally incorporated herein by reference. Radiation-curable phase change inks can exhibit additional desirable characteristics such as improved hardness and scratch-resistance and improved adhesion to various substrates. Radiation-curable gel inks can also exhibit advantages in that dot spread of the ink can be controlled, the ink does not bleed excessively into the substrate.

To maintain brand integrity of a radiation-curable ink, one must be able to identify the brand name ink with authenticity. However, with a radiation curable ink such as an ultraviolet (UV) curable ink, for example, since the ink is absorbing in the UV range, using additive materials with absorbance profiles in the same region to achieve spectroscopic monitoring is undesirable. It is preferred that such special additive materials are not visible (covert) and have a unique absorbance profile. Furthermore, it is desirable to be able to check the ink for brand authenticity both before printing and curing as well as after printing and curing. Typically, UV-active additives like fluorescent materials are widely used for providing security to ink and printed documents. However, they are not desirable for use with UV-curable inks for authentication because the uncured ink will cure in the act of authentication. Moreover, these UV-active additives may not be stable in the ink composition. Therefore, a need exists for covert, non-reactive taggants in radiation-curable inks that can be detected in both the uncured and the cured, printed ink. In one specific embodiment, it is desirable that the chosen taggant material survive the radiation-curing step essentially unaltered.

SUMMARY

Disclosed herein is an ink composition comprising (a) a phase change ink carrier which comprises at least one curable monomer, oligomer, or prepolymer; (b) an initiator; (c) an infrared-absorbing taggant; and (d) an optional colorant, the said ink being curable upon exposure to radiation; the said ink absorbing radiation in the infrared region. Also disclosed herein is a process which comprises (1) incorporating into an ink jet printing apparatus a radiation curable solid ink composition comprising: (a) a phase change ink carrier which comprises at least one curable monomer, oligomer, or prepolymer; (b) an initiator; (c) an infrared-absorbing taggant; and (d) an optional colorant, the ink being curable upon exposure to radiation; the ink absorbing radiation in the infrared region; (2) melting the ink; (3) causing droplets of the melted ink to be ejected in an imagewise pattern onto a substrate; and (4) exposing the imagewise pattern to ultraviolet radiation. Further disclosed herein is a curable solid ink jet ink stick or pellet which comprises a radiation curable solid ink composition comprising (a) a phase change ink carrier which comprises at least one curable monomer, oligomer, or prepolymer; (b) an initiator; (c) an infrared-absorbing taggant; and (d) an optional colorant, said ink being curable upon exposure to radiation; said ink absorbing radiation in the infrared region.

DETAILED DESCRIPTION

Figure 1:
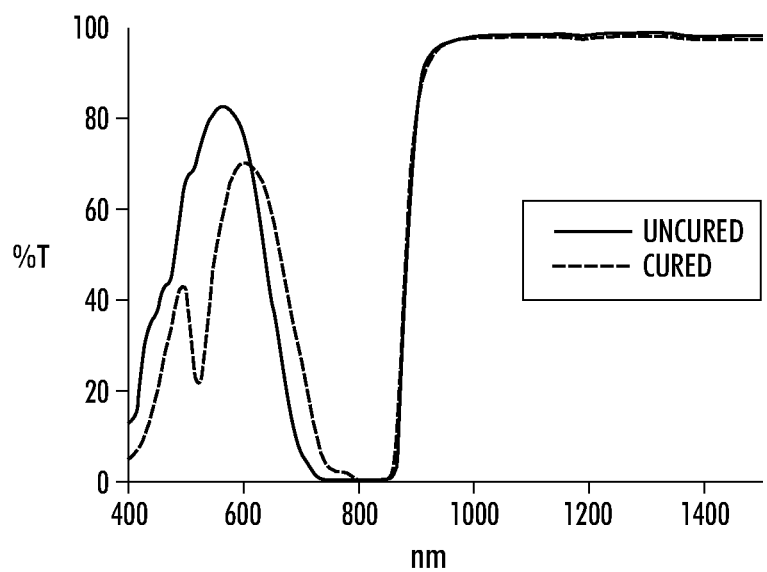
FIG. 1 illustrates the UV-Visible transmission spectra of an uncolored infrared-absorbing radiation-curable ink as disclosed herein before and after curing.

The inks disclosed herein are curable. By "curable" is meant that the ink carriers comprise at least one compound that is polymerizable or chain extendable, i.e., a material that can be cured via polymerization, including (but not limited to) free radical polymerization or chain extension, cationic polymerization or chain extension, and/or in which polymerization is photoinitiated through use of a radiation sensitive photoinitiator. Radiation curable as used herein is intended to cover all forms of curing upon exposure to a radiation source, including (but not limited to) light and heat sources and including in the presence or absence of initiators. Examples of radiation curing include (but are not limited to) ultraviolet (UV) light, for example having a wavelength of from about 200 to about 400 nanometers, visible light, or the like, optionally in the presence of photoinitiators and/or sensitizers, e-beam radiation, optionally in the presence of photoinitiators, thermal curing, optionally in the presence of high temperature thermal initiators (and which are preferably largely inactive at the jetting temperature when used in phase change inks), and appropriate combinations thereof.

Examples of suitable curable monomers, oligomers, and prepolymers include (but are not limited to) acrylated esters, acrylated polyesters, acrylated ethers, acrylated polyethers, acrylated epoxies, urethane acrylates, and pentaerythritol tetraacrylate, as well as mixtures thereof. Specific examples of suitable acrylated monomers include monoacrylates, diacrylates, and polyfunctional alkoxylated or polyalkoxylated acrylic monomers comprising one or more di- or tri-acrylates, and the like, as well as mixtures thereof. Suitable monoacrylates include, for example, cyclohexyl acrylate, 2-ethoxy ethyl acrylate, 2-methoxy ethyl acrylate, 2-(2-ethoxyethoxy) ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, tricyclodecane dimethanol diacrylate, dioxane glycol diacrylate, and the like, as well as mixtures thereof. Suitable polyfunctional alkoxylated or polyalkoxylated acrylates include, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like, as well as mixtures thereof.

One specific suitable monomer is a propoxylated neopentyl glycol diacrylate, such as, for example, SR9003 (Sartomer Co., Inc., Exton, Pa.). Other suitable reactive monomers are likewise commercially available from, for example, Sartomer Co., Inc., Henkel Corp., Radcure Specialties, and the like. Specific examples of suitable acrylated oligomers include, for example, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like, as well as mixtures thereof.

When a reactive diluent is added to the ink carrier, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

The ink carrier can also optionally contain a gellant material. Gellants can be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state). Accordingly, dot spread can be achieved, particularly on porous substrates, and excessive bleeding of the ink into the substrate can be reduced or eliminated. Showthrough of the image to the reverse side of the substrate can also be reduced or eliminated.

The gellant can function to increase dramatically the viscosity of the radiation curable phase change ink within a desired temperature range. In particular, the gellant can form a semi-solid gel in the ink carrier at temperatures below the specific temperature at which the ink is jetted. The semi-solid gel phase in a specific embodiment is a physical gel that exists as a dynamic equilibrium comprising one or more solid gellant molecules and a liquid solvent. The semi-solid gel phase is believed to be a dynamic networked assembly of molecular components held together by non-covalent bonding interactions such as hydrogen bonding, Van der Waals interactions, aromatic non-bonding interactions, ionic or coordination bonding, London dispersion forces, or the like, which upon stimulation by physical forces such as temperature or mechanical agitation or chemical forces such as pH or ionic strength, can undergo a reversible transition from liquid to semi-solid state at the macroscopic level. The inks exhibit a thermally reversible transition between the semi-solid gel state and the liquid state when the temperature is varied above or below the gel phase transition of the ink. This reversible cycle of transitioning between semi-solid gel phase and liquid phase can be repeated many times in the ink formulation. Mixtures of one or more gellants can be used to effect the phase-change transition.

Examples of suitable gellant materials include (but are not limited to) curable amide gellants as disclosed in U.S. Pat. No. 7,714,040, the disclosure of which is totally incorporated herein by reference, such as those of the formula

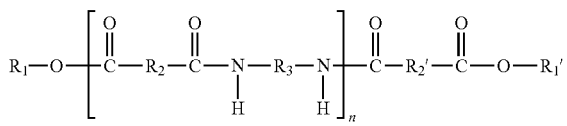

wherein:

$R_1$ and $R_1'$ each, independently of the other, is:

(i) an alkyl group having at least one ethylenic unsaturation therein (including linear and branched, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein hetero atoms, such as oxygen, nitrogen, sulfur, silicon, phosphorus, boron, and the like either may or may not be present in the alkylene group), in one embodiment with at least 2 carbon atoms, in another embodiment with at least about 4 carbon atoms, in yet another embodiment with at least about 6 carbon atoms, in still another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, and in yet another embodiment with at least about 36 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, (ii) arylene groups (wherein an arylene group is defined as a divalent aromatic group or aryl group, including substituted and unsubstituted arylene groups, and wherein hetero atoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, wherein the substituents on the substituted alkylene, arylene, arylalkylene, and alkylarylene groups can be (but are not limited to) pyridine groups, pyridinium groups, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, thiocyanato groups, carboxylate groups, urethane groups, urea groups, mixtures thereof, and the like, wherein two or more substituents can be joined together to form a ring;

$R_3$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein hetero atoms, such as oxygen, nitrogen, sulfur, silicon, phosphorus, boron, and the like either may or may not be present in the alkylene group), in one embodiment with at least 2 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, (ii) an arylene group (wherein an arylene group is defined as a divalent aromatic group or aryl group, including substituted and unsubstituted arylene groups, and wherein hetero atoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 50 carbon atoms, in another embodiment with no more than about 25 carbon atoms, and in yet another embodiment with no more than about 18 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 50 carbon atoms, in another embodiment with no more than about 36 carbon atoms, and in yet another embodiment with no more than about 18 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 50 carbon atoms, in another embodiment with no more than about 36 carbon atoms, and in yet another embodiment with no more than about 18 carbon atoms, although the number of carbon atoms can be outside of these ranges, wherein the substituents on the substituted alkylene, arylene, arylalkylene, and alkylarylene groups can be (but are not limited to) pyridine groups, pyridinium groups, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, carboxylate groups, urethane groups, urea groups, mixtures thereof, and the like, wherein two or more substituents can be joined together to form a ring;

and n is an integer representing the number of repeat amide units, being in one embodiment at least 1, and in one embodiment no more than about 20, in another embodiment no more than about 15, and in yet another embodiment no more than about 10, although the value of n can be outside of these ranges.

Specific examples of these amide gellants include (but are not limited to)

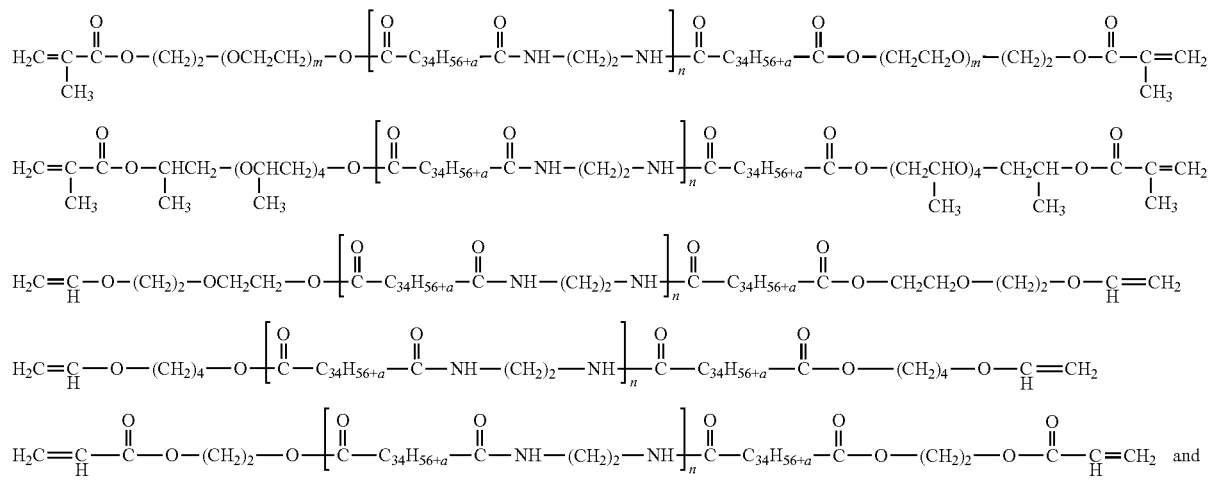

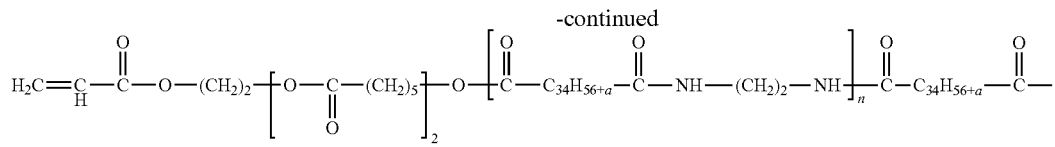
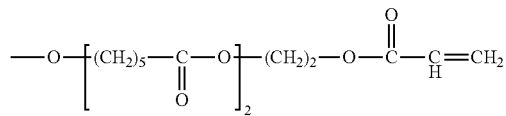
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, n is 1, and m is an integer representing the number of repeating ($OCH_2CH_2$) units, including (but not limited to) isomers of the formula
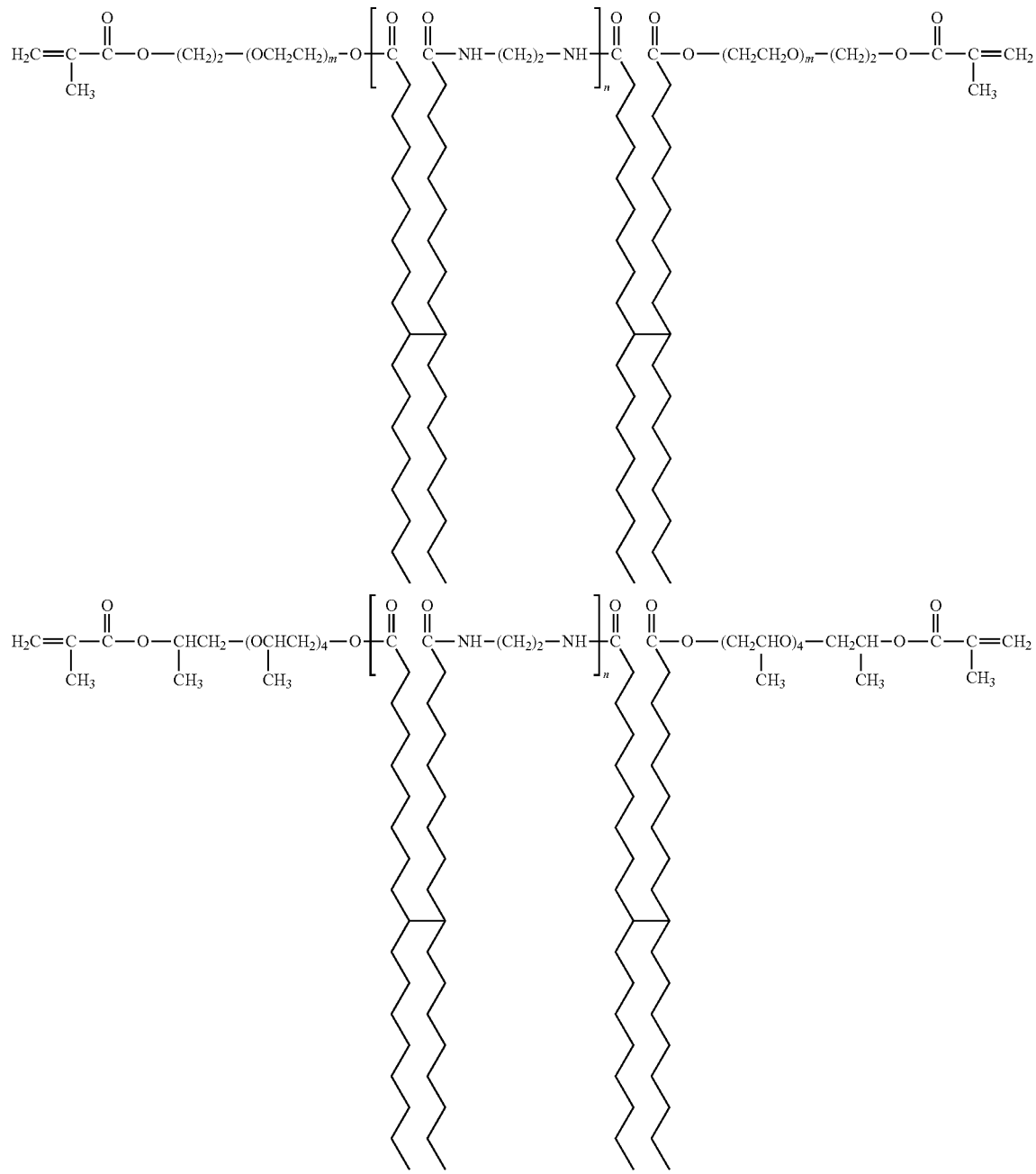

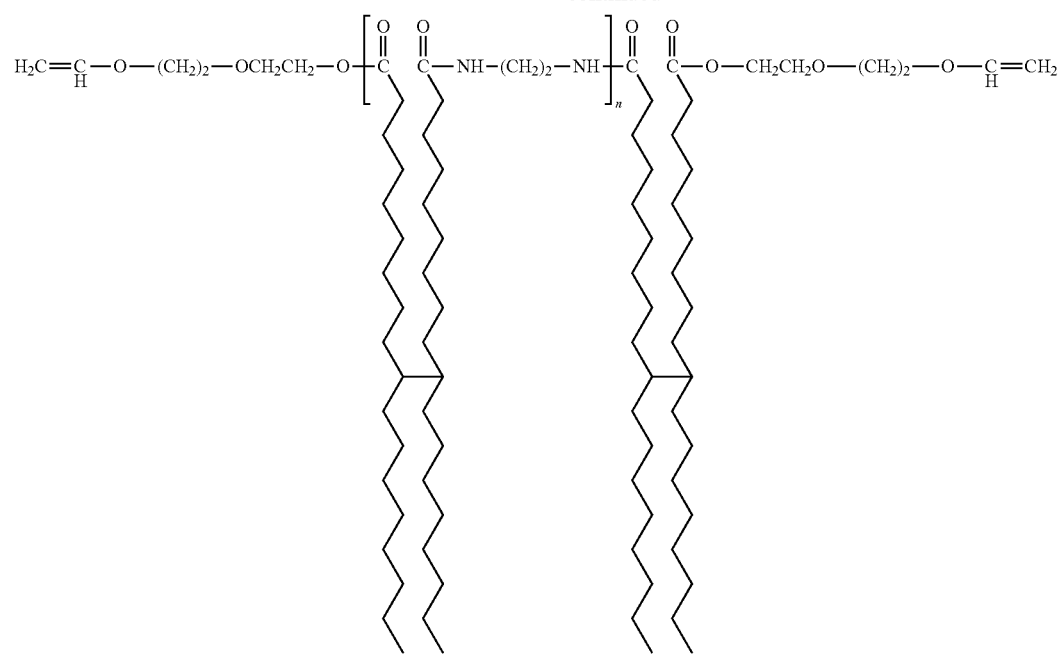
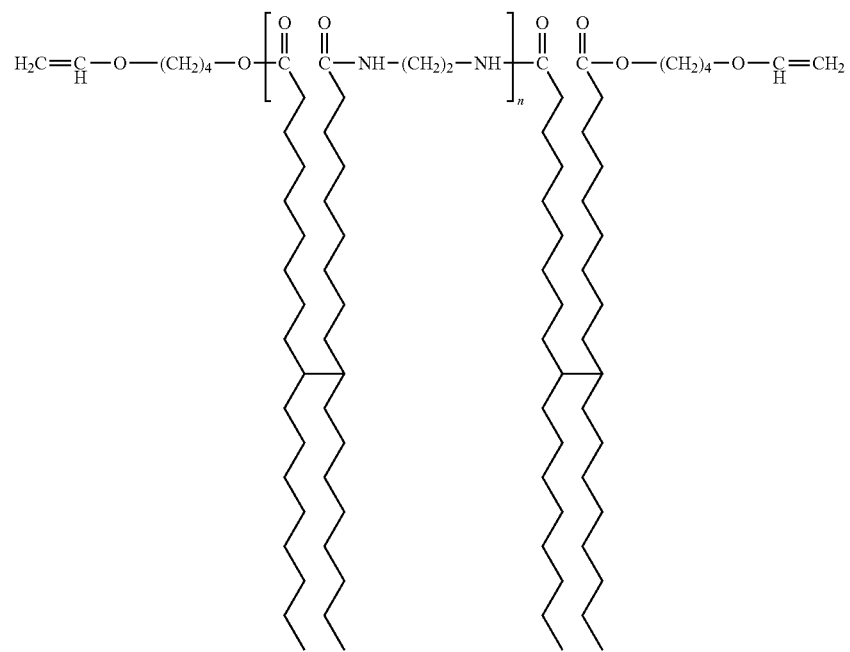

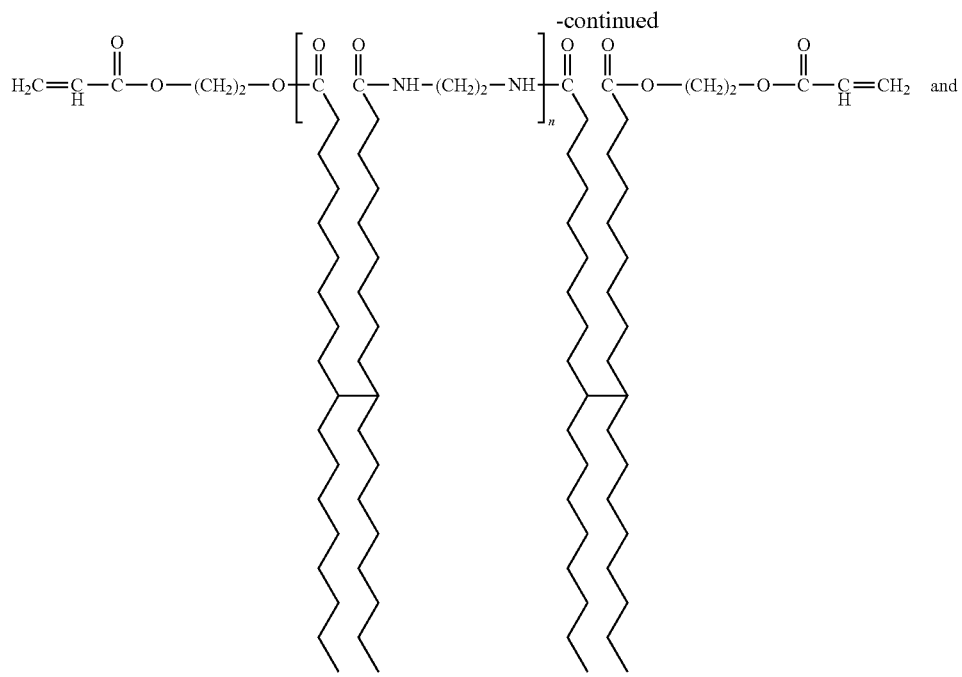
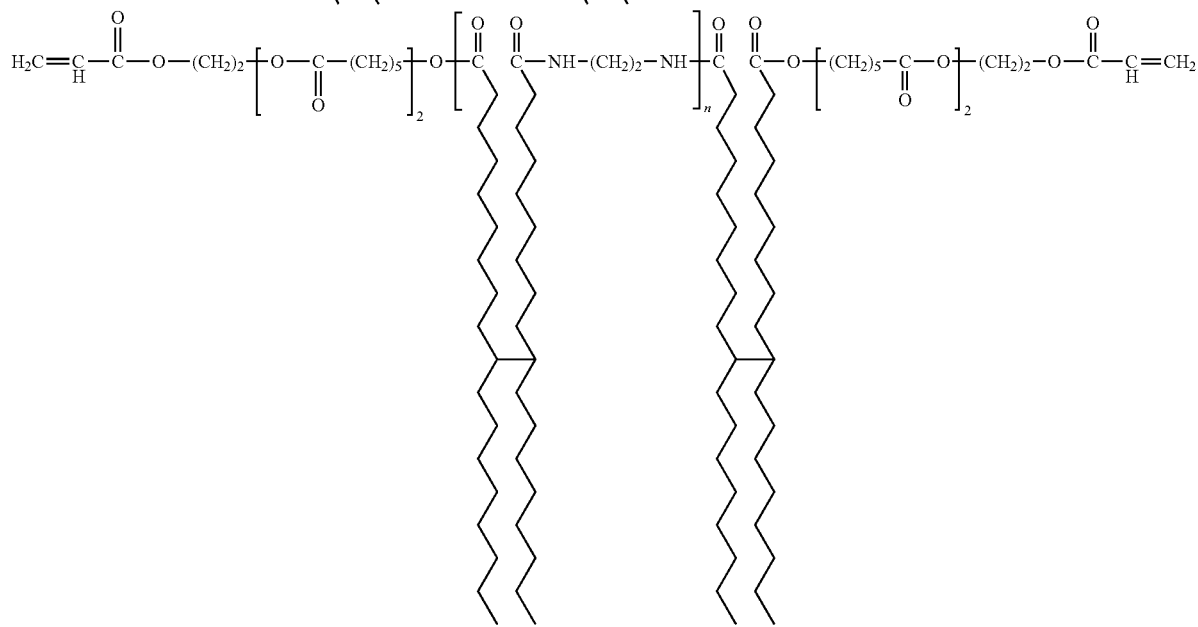
wherein n is 1 and m is an integer representing the number of repeating (OCH$_2$CH$_2$) units; and the like.
Also suitable as gellants are aromatic diamide compounds of the formula
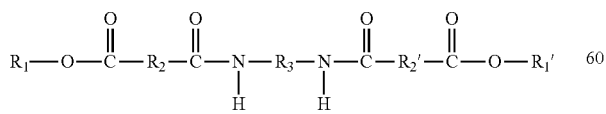
wherein R$_1$ and R$_1$' can be the same or different and wherein R$_1$ and R$_1$' each, independently of the other, can be groups such as
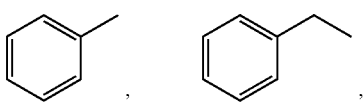
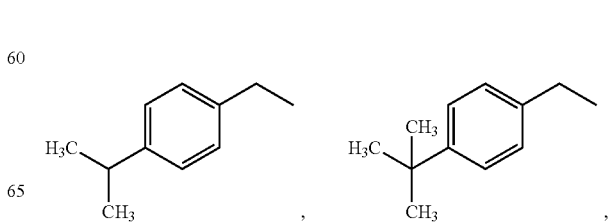

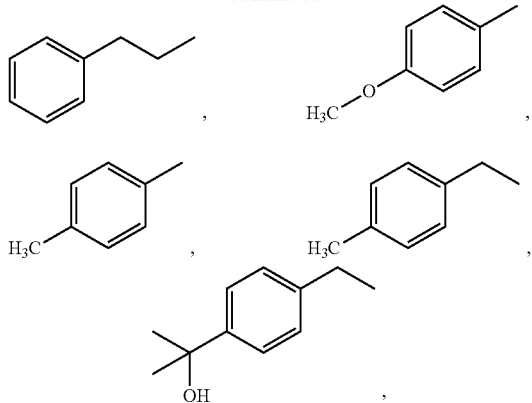

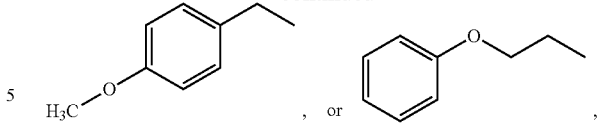

$R_2$ and $R_2'$ include groups such as isomers of the formula —$C_{34}H_{56+a}$— which are branched alkylene groups which may include unsaturations and cyclic groups, wherein a is an integer of 0, 1, 2, 3, 4, 5, 6, 7, 8, 9, 10, 11, or 12, and $R_3$ includes groups such as —$CH_2CH_2$—, as disclosed in, for example, U.S. application Ser. No. 12/765,148, filed Apr. 22, 2010, entitled "Amide Gellant Compounds with Aromatic End Groups," with the named inventors Naveen Chopra, Michelle N. Chrétien, Barkev Keoshkerian, Jennifer L. Belelie, and Peter G. Odell, the disclosure of which is totally incorporated herein by reference, such as those of the formula

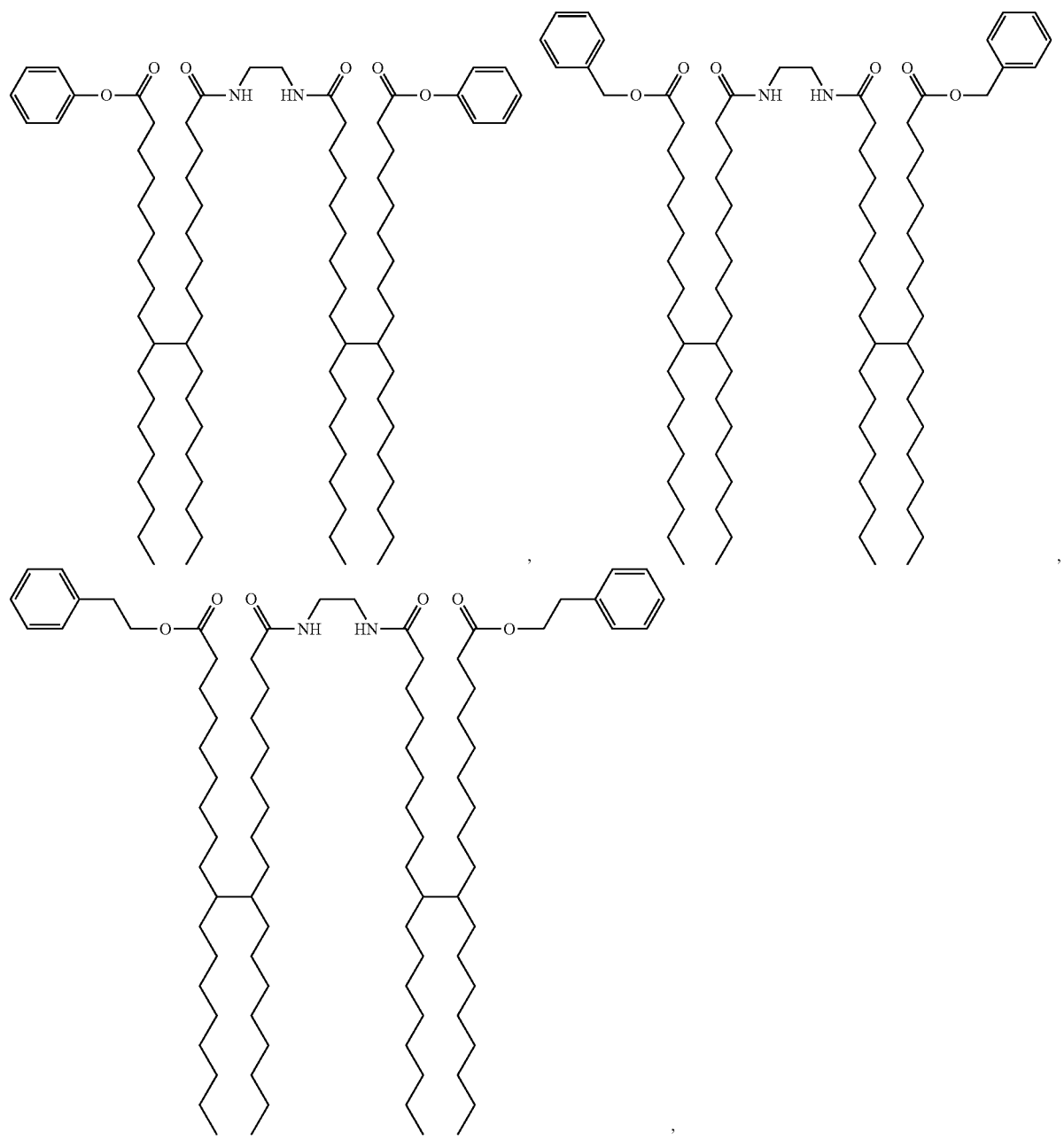

17
-continued
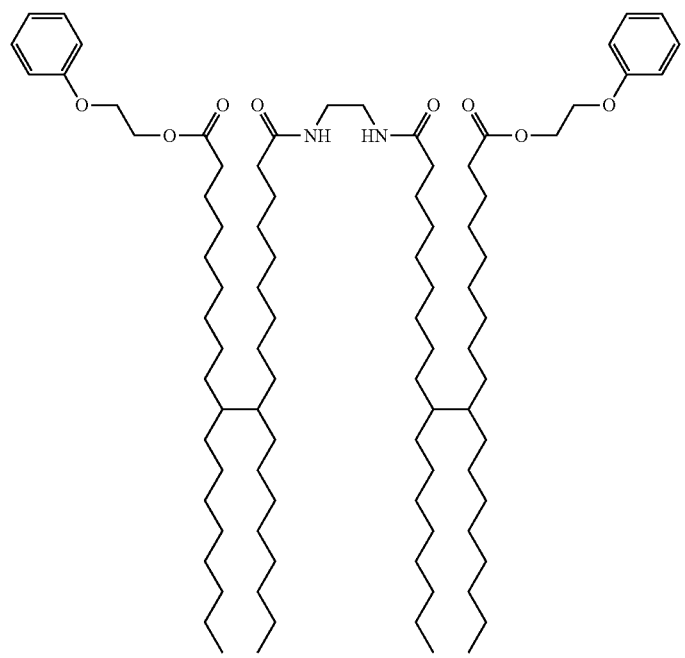
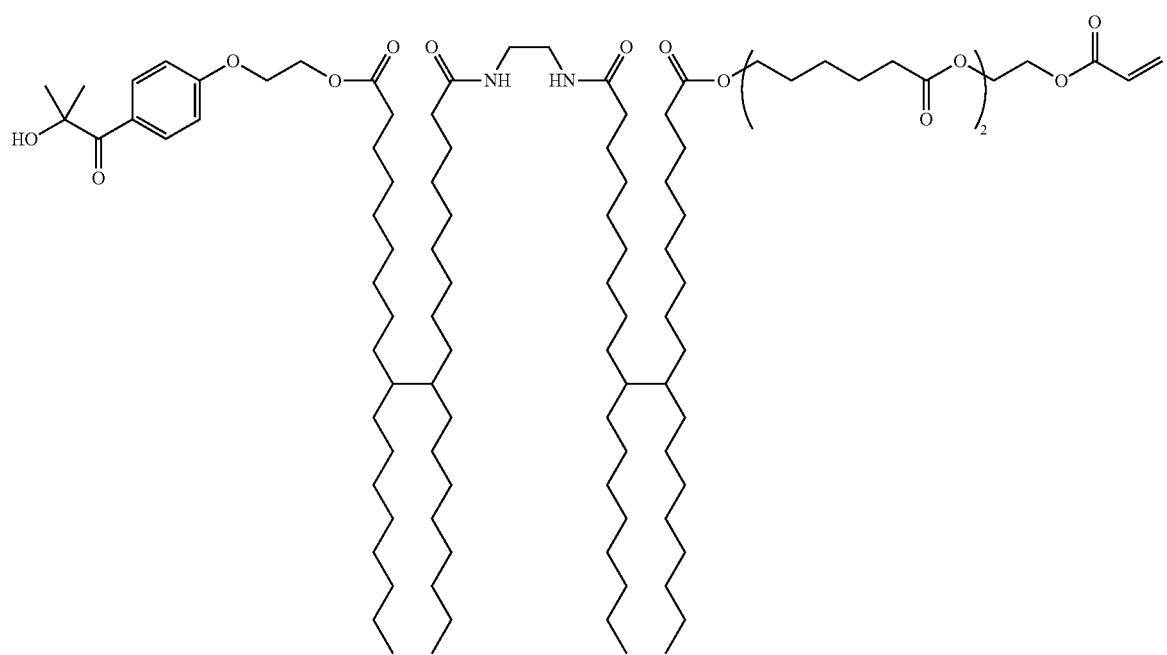

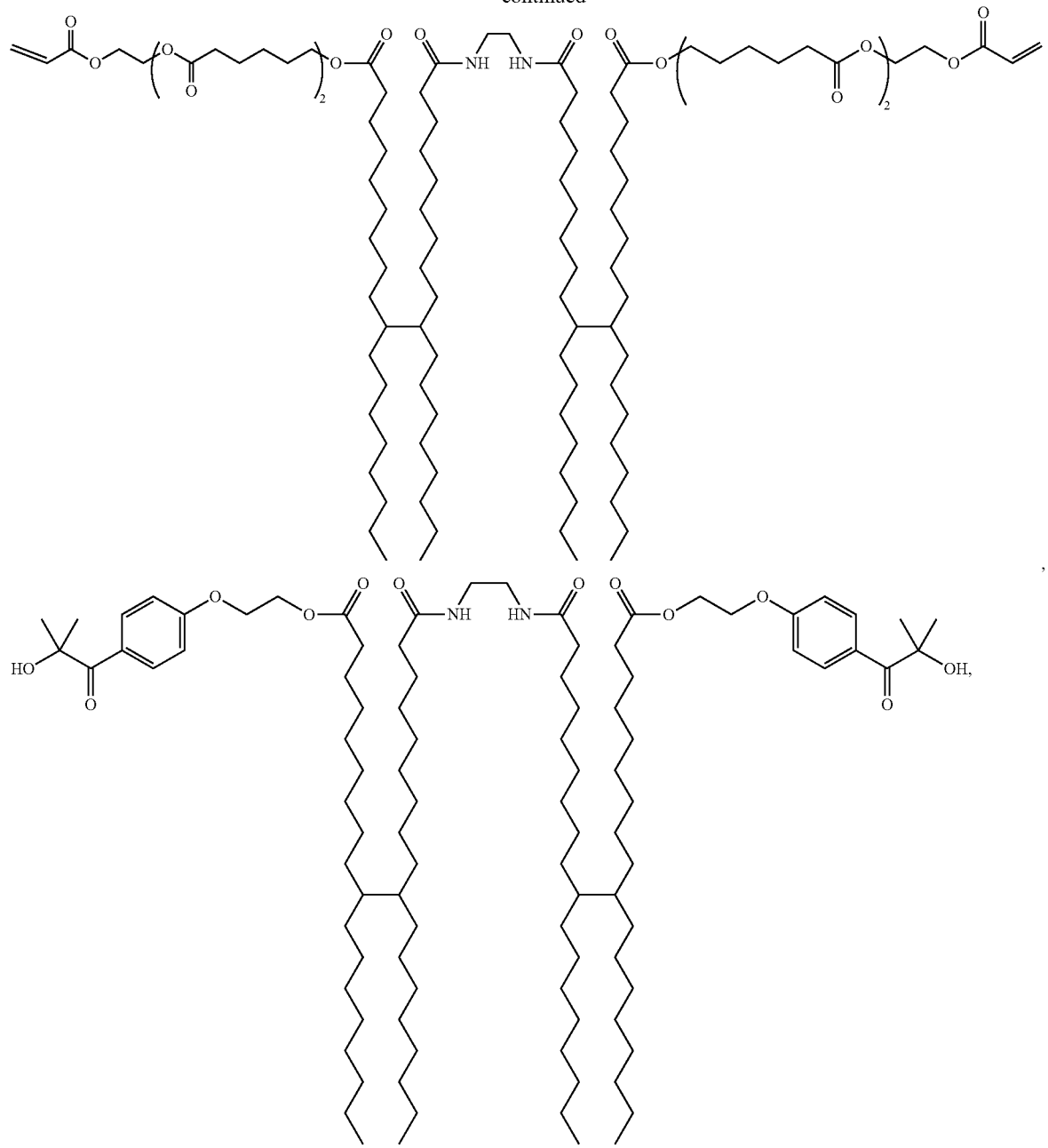

and the like, as well as mixtures thereof.

When present, the gellant is present in the ink in any desired or effective amount, in one embodiment at least about 5 percent by weight of the ink carrier, in another embodiment at least about 7.5 percent by weight of the ink carrier, and in yet another embodiment at least about 10 percent by weight of the ink carrier, and in one embodiment no more than about 50 percent by weight of the ink carrier, in another embodiment no more than about 40 percent by weight of the ink carrier, and in yet another embodiment no more than about 30 percent by weight of the ink carrier, although the amount can be outside of these ranges.

The ink carrier can also optionally contain a curable wax. The curable wax can be any suitable curable wax that is curable by free radical polymerization. Examples of suitable curable waxes include those that are functionalized with curable groups. The curable groups can include, but are not limited to, acrylate, methacrylate, alkene, alkyne, vinyl, and allylic ether. In embodiments, the radiation curable solid ink composition contains at least one curable wax and the at least one curable wax contains an acrylate, methacrylate, alkene, vinyl, or allylic ether functional group. These waxes can be synthesized by the reaction of a wax equipped with a transformable functional group, such as carboxylic acid or hydroxyl.

Suitable examples of hydroxyl-terminated polyethylene waxes that can be functionalized with a curable group include, but are not limited to, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550, and UNILIN® 700 with Mn approximately equal to 375, 460, 550, and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

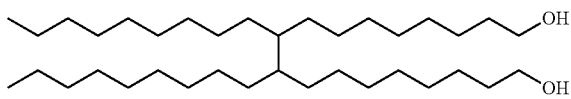 [SMILES: CCCCCCCCCC(CCCCCCCCO)C(CCCCCCCCC)CCCCCCCCO]

as well as other branched isomers which can include unsaturations and cyclic groups, available from Uniqema, New Castle, Del. Further information on C36 dimer diols is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that can be functionalized with a curable group include, but are not limited to, mixtures of carbon chains with the structure $CH_3$—$(CH_2)_n$—COOH, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550, and UNICID® 700 with Mn equal to approximately 390, 475, 565, and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

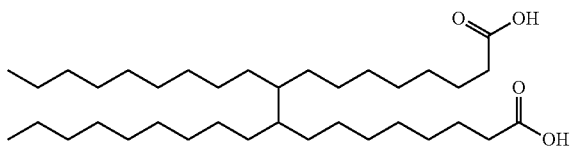 [SMILES: CCCCCCCCCC(CCCCCCCC(=O)O)C(CCCCCCCCC)CCCCCCCC(=O)O]

as well as other branched isomers which can include unsaturations and cyclic groups, available from Uniqema, New Castle, Del., can also be used. These carboxylic acids can be reacted with alcohols equipped with UV curable moieties to form reactive esters. Examples of these alcohols include, but are not limited to, 2-allyloxyethanol from Sigma-Aldrich Co.;

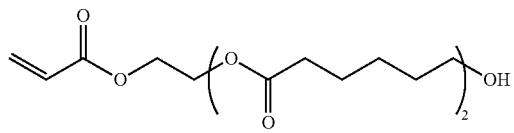

SR495B® from Sartomer Company, Inc., Exeter, Pa.; TONE® M-101 (R=H, $n_{avg}$=1), TONE® M-100 (R=H, $n_{avg}$=2) and TONE® M-201 (R=Me, $n_{avg}$=1) from Dow Chemical Company; and

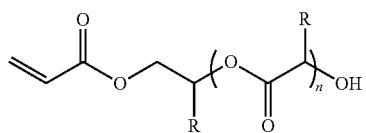

CD572® (R=H, n=10) and SR604® (R=Me, n=4) from Sartomer Company, Inc.

In one specific embodiment, the curable wax is a curable acrylate wax having a melting point of from about 50 to about 85° C. In another specific embodiment, the curable wax is UNILIN® 350 acrylate, a curable acrylate wax (C22, C23, C24 mixture, melting point about 50 to about 85° C.) available from Baker Hughes, Incorporated, PP-U350a-1®, a curable polypropylene wax available from Clariant, or a combination thereof. Synthesis of UNILIN® 350 curable acrylate wax is described in U.S. Pat. No. 7,559,639, the disclosure of which is totally incorporated herein by reference.

The curable wax can be present in the ink in any desired or effective amount, in one embodiment at least about 1 percent, in another embodiment at least about 2 percent, and in yet another embodiment at least about 3 percent, and in one embodiment no more than about 40 percent, in another embodiment no more than about 30 percent, and in yet another embodiment no more than about 20 percent, by weight of the ink carrier, although the amounts can be outside of these ranges.

The ink carrier is present in the phase change ink in any desired or effective amount, in one embodiment of at least about 0.1 percent by weight of the ink, in another embodiment of at least about 50 percent by weight of the ink, in yet another embodiment of at least about 70 percent by weight of the ink, and in still another embodiment of at least about 90 percent by weight of the ink, and in one embodiment of no more than about 97 percent by weight of the ink, in another embodiment of no more than about 95 percent by weight of the ink, and in yet another embodiment of no more than about 85 percent by weight of the ink, although the amount can be outside of these ranges.

The ink compositions further comprise a radical initiator. Examples of radical photoinitiators include benzophenone derivatives, benzyl ketones, monomeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators available as IRGACURE® and DAROCUR® from Ciba, isopropyl thioxanthenones, and the like, as well as mixtures thereof. Specific examples include 1-hydroxy-cyclohexylphenylketone, benzophenone, benzophenone derivatives, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone, 2,4,6-trimethylbenzoyldiphenylphosphine oxide (available as BASF LUCIRIN TPO®), 2,4,6-trimethylbenzoylethoxyphenylphosphine oxide (available as BASF LUCIRIN TPO-L®), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino 1-(4-morpholinophenyl)butanone-1 (available as Ciba IRGACURE® 369), 2-hydroxy-1-(4-(4-(2-hydroxy-2-methylpropionyl)-benzyl)-phenyl)-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthenones, 1-hydroxy-cyclohexylphenylketone, benzophenone, 2,4,6-trimethylbenzophenone, 4-methylbenzophenone, diphenyl-(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, and the like, as well as mixtures thereof.

In one specific embodiment, the ink contains an α-amino ketone, such as IRGACURE® 379 (Ciba Specialty Chemicals), 2-hydroxy-1-(4-(4-(2-hydroxy-2-methylpropionyl)-benzyl)-phenyl)-2-methylpropan-1-one, such as IRGACURE® 127 (Ciba Specialty Chemicals), bis(2,4,6-trimethylbenzoyl)-phenylphosphineoxide, such as IRGACURE® 819, and 2 isopropyl-9H-thioxanthen-9-one, such as DAROCUR® ITX (Ciba Specialty Chemicals).

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

The initiator can be a cationic initiator. Examples of suitable cationic photoinitiators include aryldiazonium salts, diaryliodonium salts, triarysulfonium salts, triarylselenonium salts, dialkylphenacylsulfonium salts, triarylsulphoxonium salts, aryloxydiarylsulfonium salts, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the carrier, and in another embodiment at least about 1 percent by weight of the carrier, and in one embodiment no more than about 15 percent by weight of the carrier, and in another embodiment no more than about 10 percent by weight of the carrier, although the amount can be outside of these ranges.

The ink carrier can contain additional optional additives. Optional additives can include surfactants, light stabilizers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, which are agents that create or reduce different gloss levels, opacifiers, antistatic agents, dispersants, and the like. The inks can include, as a stabilizer, a radical scavenger, such as IRGASTAB UV 10 (Ciba Specialty Chemicals, Inc.). The inks can also include an inhibitor, such as a hydroquinone, to stabilize the composition by prohibiting or at least delaying polymerization of the oligomer and monomer components during storage, thus increasing the shelf life of the composition.

The inks disclosed herein also contain a taggant that absorbs in the infrared region of the spectrum, and in one specific embodiment, in the near-infrared (near-IR) region of the spectrum. By "near-IR" is meant in one specific embodiment from about 730 nm to about 2,500 nm, although the value can be outside of this range. In one specific embodiment, the infrared-absorbing taggant is selected so that it is essentially undetectable in the ink under normal lighting conditions, rendering it covert. This end can be accomplished by selecting a taggant of the same color as the colorant chosen for the ink, or by selecting a taggant that is essentially colorless in the visible wavelength range. Examples of suitable infrared-absorbing taggants include those of the formula

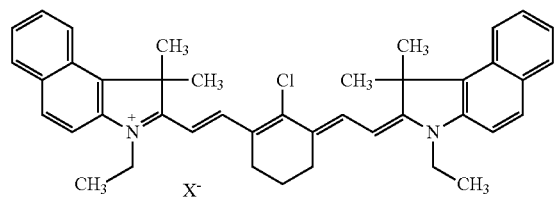

wherein X is an anion, such as 2-[2-[2-chloro-3-[2-(1,3-dihydro-3,3-dimethyl-1-ethyl-2H-benz[e]indol-2-ylidene)ethylidene]-1-cyclohexen-1-yl]-ethenyl]-3,3-dimethyl-1-ethyl-1H-benz[e]indolium iodide, absorption maximum 815 nm in methanol, available as ADS815EI from American Dye Source, Baie d'Urfe, Quebec, those of the formula

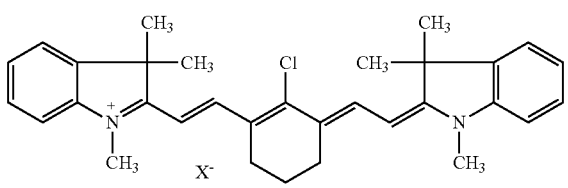

wherein X is an anion, such as 2-[2-[2-chloro-3-[(1,3-dihydro-1,3,3-trimethyl-2H-indol-2-ylidene)-ethylidene]-1-cyclohexen-1-yl]ethenyl]-1,3,3-trimethylindolium iodide], absorption maximum 775 nm in methanol, available as ADS775MI from American Dye Source, and 2-[2-[2-chloro- 3-[(1,3-dihydro-1,3,3-trimethyl-2H-indol-2-ylidene)ethylidene]-1-cyclohexen-1-yl]-ethenyl]-1,3,3-trimethyl-1H-indolium perchlorate, absorption maximum 775 nm in methanol, available as ADS775MP from American Dye Source, those of the formula

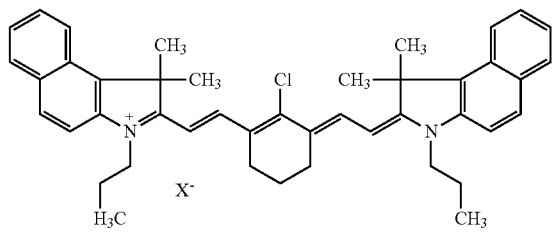

wherein X is an anion, such as 2-[2-[2-chloro-3-[(1,3-dihydro-3,3-dimethyl-1-propyl-2Hindol-2-ylidene)-ethylidene]-1-cyclohexen-1-yl]-ethenyl]-3,3-dimethyl-1-propylindolium iodide], absorption maximum 775 nm in methanol, available as ADS775PI from American Dye Source, and 2-[2-[2-chloro-3-[(1,3-dihydro-3,3-dimethyl-1-propyl-2H-indol-2-ylidene)-ethylidene]-1-cyclohexen-1-yl]-ethenyl]-3,3-dimethyl-1-propyl-1H-indolium perchlorate, absorption maximum 780 nm in methanol, available as ADS775PP from American Dye Source, those of the formula

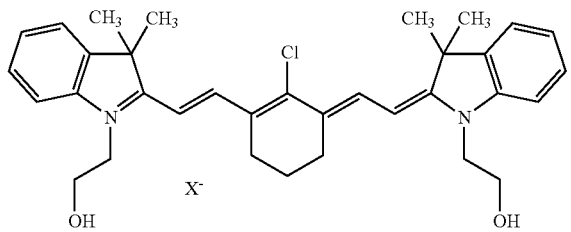

wherein X is an anion, such as 2-[2-[2-chloro-3-[(1,3-dihydro-3,3-dimethyl-1-(2-hydroxy)-ethyl-2H-Indol-2-ylidene) ethylidene]-1-cyclohexen-1-yl]ethenyl]-3,3-dimethyl-1-(2-hydroxy)ethyl-1H-idolium perchlorate, absorption maximum 780 nm in methanol, available as ADS780HO from American Dye Source, those of the formula

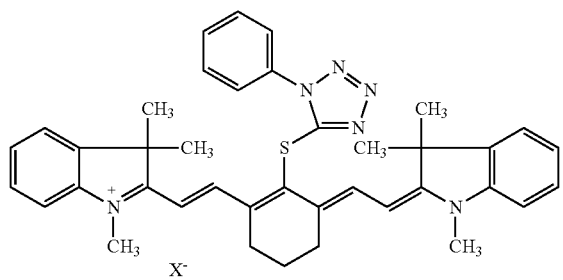

wherein X is an anion, such as 2-[2-[3-[2-(1,3-dihydro-1,3,3-trimethyl-2H-indol-2-ylidene)ethylidene]-2-(1-phenyl-1H-tetrazol-5-ylsulfanyl)-1-cyclohexen-1-yl]-ethenyl]-1,3,3-trimethyl-3H-indolium chloride, absorption maximum 798 nm in methanol, available as ADS798SM from American Dye Source, those of the formula

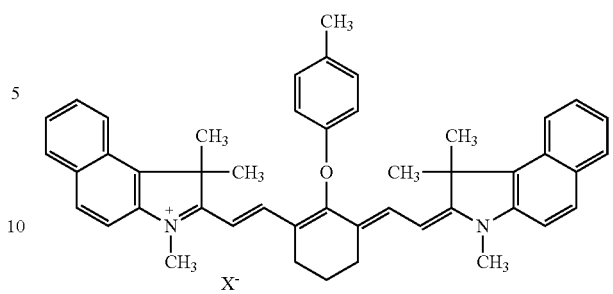

wherein X is an anion, such as 2-[2-[2-(4-methylbenzeneoxy)-3-[2-(1,3-dihydro-1,1,3-trimethyl-2H-benz[e]-indol-2-ylidene)ethylidene]-1-cyclohexen-1-yl]-ethenyl]-1,1,3-trimethyl-1H-benz[e]indolium 4-methylbenzenesulfonate, absorption maximum 811 nm in methanol, available as ADS800AT from American Dye Source, those of the formula

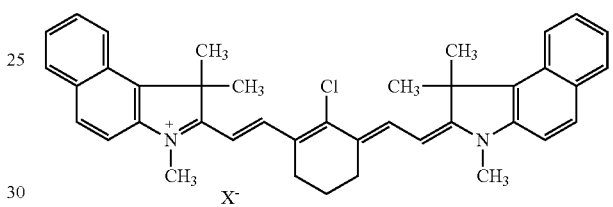

wherein X is an anion, such as 2-[2-[2-chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo[e]indolium-4-methylbenzenesulfonate, absorption maximum 812 nm in methanol, available as ADS830AT from American Dye Source, those of the formula

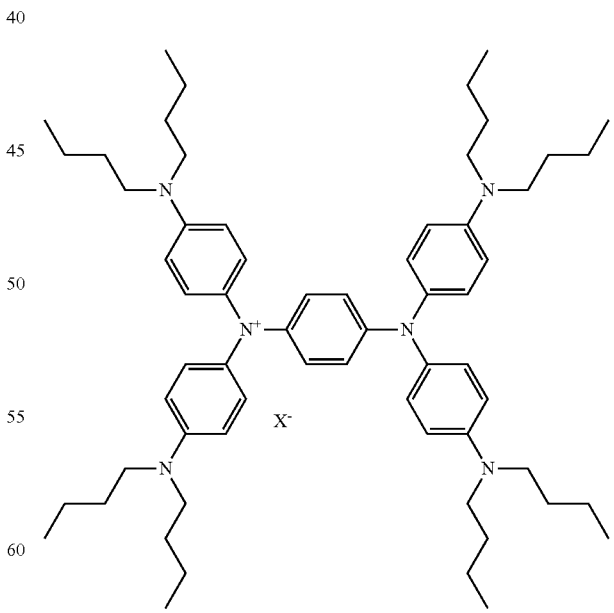

wherein X is an anion, such as when X is SbF$_6$, absorption maximum 906 nm in acetone, available as ADS900AF from American Dye Source, those of the formula

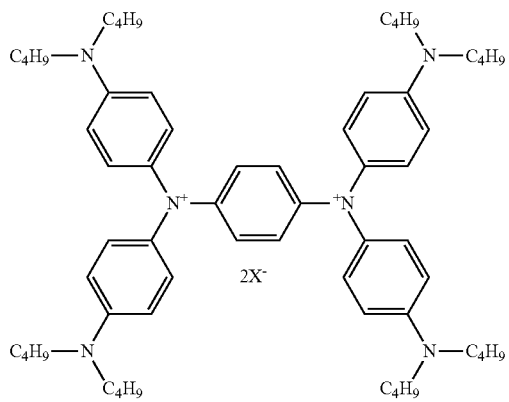

wherein X is an anion, such as N,N,N,N-tetrakis(4-dibutylaminophenyl)-p-benzoquinone bis(iminium hexafluoroantimonate), absorption maximum 1060 nm in methanol, available as ADS1065A from American Dye Source, those of the formula

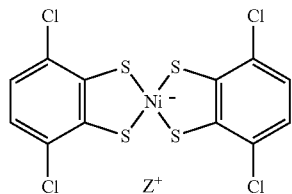

wherein Z is a cation, such as tetrabutylammonium bis(3,6-dichloro-1,2-benzene-dithiolato)nickelate, absorption maximum 845 nm in acetone, available as ADS845MC from American Dye Source, those of the formula

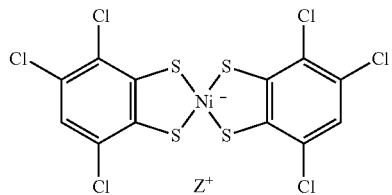

wherein Z is a cation, such as tetrabutylammonium bis(3,4,6-trichloro-1,2-benzene-dithiolato)nickelate, absorption maximum 865 nm in acetone, available as ADS870MC from American Dye Source, those of the formula

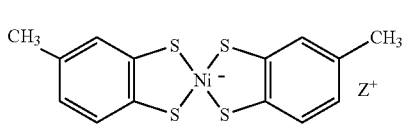

wherein Z is a cation, such as tetrabutylammonium bis(4-methyl-1,2-benzenedithiolato)nickelate, absorption maximum 892 nm in acetone, available as ADS890MC from American Dye Source, those of the formula

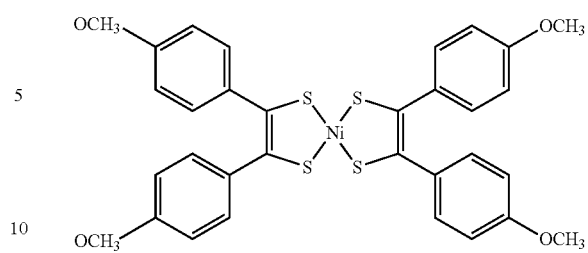

which is bis(4,4'-dimethoxydithiobenzil) nickel, absorption maximum 920 nm in acetone, available as ADS920MC from American Dye Source, those of the formula

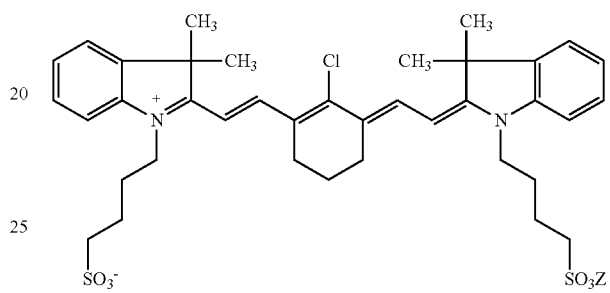

wherein Z is a cation, such as 2-[2-[2-(4-methylbenzeneoxy)-3-[(1,3-dihydro-3,3-dimethyl-1-(4-sulfobutyl)-2H-benz[e]indol-2-ylidene)-ethylidene]-1-cyclohexen-1-yl]-ethenyl]-3,3-di-methyl-1-(4-sulfo-butyl)-1H-benz[e]indolium, inner salt, monosodium salt, absorption maximum 782 nm in methanol, available as ADS780WS from American Dye Source, those of the formula

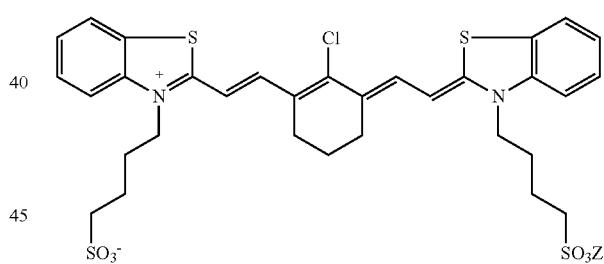

wherein Z is a cation, such as 2-[2-[2-chloro-3-[2-(3-(4-sulfobutyl)-3H-benzthiazol-2-ylidene)ethylidene]-1-cyclohexen-1-yl]-ethenyl]-3-(4-sulfobutyl)benzthiazonium, inner salt, triethylammonium salt, absorption maximum 803 nm in methanol, available as ADS795WS from American Dye Source, those of the formula

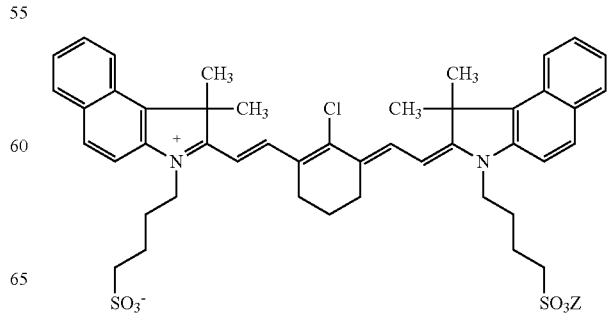

wherein Z is a cation, such as 2-[2-[2-chloro-3-[2-(1,3-dihydro-3,3-dimethyl-1-(4-sulfobutyl)-2H-benz[e]-indol-2-ylidene)-ethylidene]-1-cyclohexen-1-yl]-ethenyl]-3,3-dimethyl-1-(4-sulfobutyl)-1H-benz[e]indolium, inner salt, free acid, absorption maximum 819 nm, available as ADS830WS from American Dye Source, those of the formula

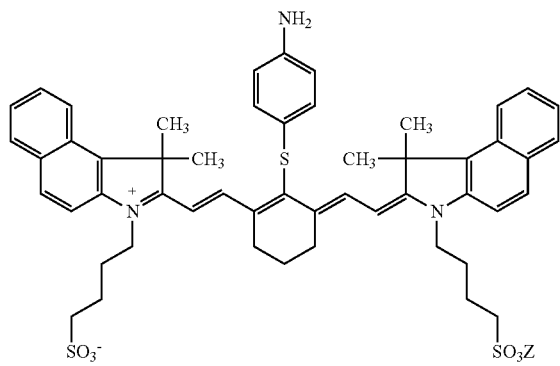

wherein Z is a cation, such as 2-[2-[2-(4-aminothiophenyl)-3-[[1,3-dihydro-1,1-dimethyl-3-(4-sulfobutyl)-2H-benz[e]-indol-2-ylidene]ethylidene]-1-cyclohexen-1-yl]ethenyl]-1,1-dimethyl-3-(4-sulfonyl)-, inner salt, sodium salt, absorption maximum 824 nm in methanol, available as ADS832WS from American Dye Source, and the like, as well as mixtures thereof. Examples of suitable anions include monovalent, divalent, trivalent, and higher anions, including but not limited to $Cl^-$, $Br^-$, $I^-$, $HSO_4^-$, $HSO_3^-$, $½SO_4^{2-}$, $½SO_3^{2-}$, $CH_3SO_3^-$, $CH_3C_6H_4SO_3^-$, $NO_3^-$, $HCOO^-$, $CH_3COO^-$, $H_2PO_4^-$, $½HPO_4^{2-}$, $SCN^-$, $BF_4^-$, $ClO_4^-$, $SSO_3^-$, $PF_6^-$, $SbCl_6^-$, organic anions, or the like, as well as mixtures thereof. Examples of suitable cations include monovalent, divalent, trivalent, and higher cations, including but not limited to $H^+$, alkali metal cations, such as $Li^+$, $Na^+$, $K^+$, $Rb^+$, and $Cs^+$, alkaline earth metal cations, such as $½Mg^{2+}$, $½Ca^{2+}$, $½Sr^{2+}$, and $½Ba^{2+}$, $⅓Al^{3+}$, $NH_4^+$, organic cations, or the like, as well as mixtures thereof.

The infrared-absorbing taggant is present in the ink carrier in any desired or effective amount, in one embodiment at least about 0.1 percent by weight of the ink carrier, in another embodiment at least about 2 percent by weight of the ink carrier, in yet another embodiment at least about 3 percent by weight of the ink carrier, and in still another embodiment at least about 4 percent by weight of the ink carrier, and in one embodiment no more than about 20 percent by weight of the ink carrier, in another embodiment no more than about 10 percent by weight of the ink carrier, and in yet another embodiment no more than about 5 percent by weight of the ink carrier, although the amount can be outside of these ranges.

Optionally, the inks can contain a colorant in addition to the infrared-absorbing taggant. Any desired or effective colorant can be employed, including dyes, pigments, mixtures thereof, and the like, provided that the colorant can be dissolved or dispersed in the ink carrier. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (BASF); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (BASF); Orasol Black RLP (BASF); Savinyl Black RLS (Clariant); Morfast Black Conc. A (Rohm and Haas); Orasol Blue GN (BASF); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

When present, the optional colorant is present in the phase change ink in any desired or effective amount to obtain the desired color or hue, in one embodiment at least about 0.1 percent by weight of the ink, and in another embodiment at least about 0.2 percent by weight of the ink, and in one embodiment no more than about 15 percent by weight of the ink, and in another embodiment no more than about 8 percent by weight of the ink, although the amount can be outside of these ranges.

The radiation curable phase change inks can also, if desired, contain additives to take advantage of the known functionality associated with such additives. Such additives may include, for example, defoamers, slip and levelling agents, pigment dispersants, and the like, as well as mixtures thereof. The inks can also include additional monomeric or polymeric materials as desired.

Curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20 to about 25° C.). The inks are solid at ambient temperature.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

An infrared-absorbing radiation-curable ink was prepared by dissolving 0.020 g of 2-[2-[2-chloro-3-[2-(1,3-dihydro-3,3-dimethyl-1-ethyl-2H-benz[e]indol-2-ylidene)ethylidene]-1-cyclohexen-1-yl]-ethenyl]-3,3-dimethyl-1-ethyl-1H-benz[e]indolium iodide (ADS815EI, obtained from American Dye Source, Baie d'Urfe, Quebec) into 10 g of an ink carrier of the following composition: gellant of the formula

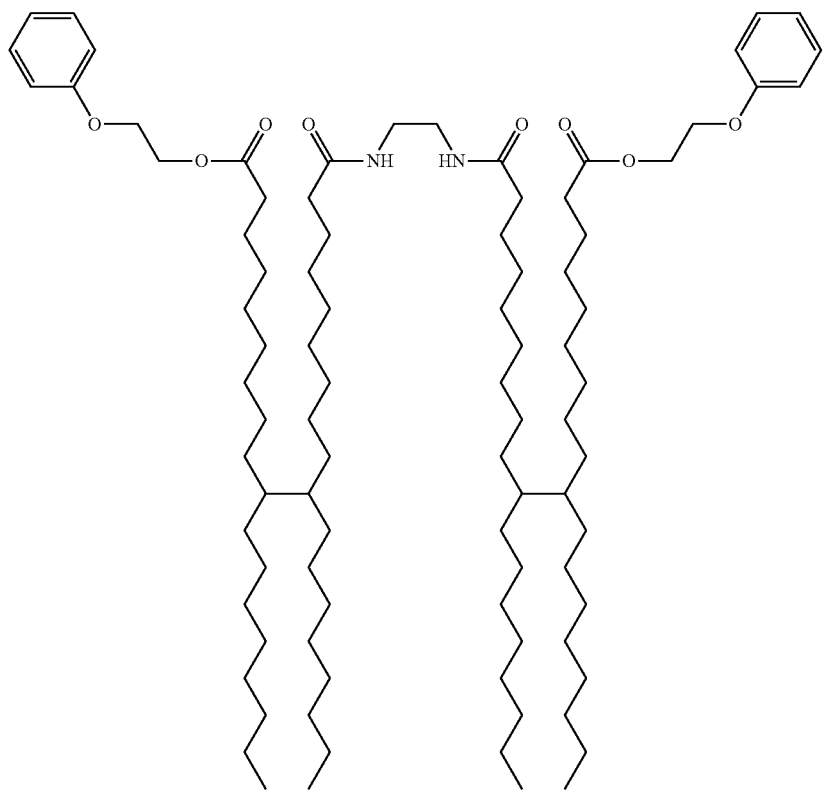 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccccc1)C(CCCCCCCC)CCCCCCCCC(=O)OCCOc1ccccc1]

prepared as disclosed in U.S. application Ser. No. 12/765, 148, filed Apr. 22, 2010, the disclosure of which is totally incorporated herein by reference, 7.5%; UNILIN 350-acrylate, a curable acrylate wax prepared as disclosed in U.S. Pat. No. 7,559,639, the disclosure of which is totally incorporated herein by reference, 5%; dioxaneglycol diacrylate (CD539, obtained from Sartomer Corp.), 74.8%; dipentaerythritol pentaacrylate curable monomer (SR399LV, obtained from Sartomer Corporation), 5%; IRGACURE 379, 3%; IRGACURE 819, 1%; IRGACURE 127, 3.5%; IRGASTAB UV10, 0.2%. The dye and ink carrier mixture was heated and stirred at 85° C. to form an ink. Samples for testing the optical properties of the ink thus prepared were made by sandwiching the ink between glass slides. The thickness of the samples was controlled with 25 μm glass spacers. The ink samples were then cured using a 600 W Fusions Lighthammer lamp fitted with a mercury D-bulb at a belt speed of 32 ft/min.

UV-visible transmission spectra were recorded on a CARY 5000 UV-VIS-NIR spectrophotometer (Varian Corporation) before and after UV curing and are shown together in FIG. 1. As the results indicate, strong absorption (essentially no transmission) is observed in the near-IR region (typically from about 750 nm to about 900 nm) of the spectrum, which is outside the visible range (typically less than about 730 nm). This result indicates that the IR-absorbing dye is suitable providing security, since this absorption range is typically not displayed by colored inks, which tend to absorb only in the visible range of the spectrum. As a result, the ink will be detectable with a standard commercially-available IR camera for authentication purposes.

In addition, the spectra in FIG. 1 indicate that there is no significant decrease of absorption (i.e. increase of transmission) in the region of interest (from about 750 nm to about 900 nm), indicating that the dye was stable to UV radiation and thermally stable as well. These results show that the dye was fully compatible with the ink carrier and was and robust to curable ink formulation, printing, and curing processes.

EXAMPLE II

A curable ink was prepared by dispersing 0.4 g of 2-[2-[2-chloro-3-[2-(1,3-dihydro-3,3-dimethyl-1-ethyl-2H-benz[e]indol-2-ylidene)ethylidene]-1-cyclohexen-1-yl]-ethenyl]-3,3-dimethyl-1-ethyl-1H-benz[e]indolium iodide (ADS815EI, obtained from American Dye Source) into 10 g of a cyan UV curable ink of the following composition:

| Component | Wt. % |
|---|---|
| Amide Gellant | 7.5 |
| UNILIN 350-acrylate | 5 |
| SR9003 (propoxylated neopentyl glycol diacrylate)* | 54.8 |
| SR399LV dipentaerythritol pentaacrylate | 5 |
| IRGACURE 379 | 3 |
| IRGACURE 819 | 1 |
| IRGACURE 127 | 3.5 |
| IRGASTAB UV10 | 0.2 |
| SPECTRAPAC-C cyan pigment** dispersion in SR9003† | 20 |

*obtained from Sartomer Co., Inc., Exton, PA
**obtained from Sun Chemical
†dispersion contained 15 wt. % pigment The amide gellant contained an approximately statistical amount of the following three compounds:

35
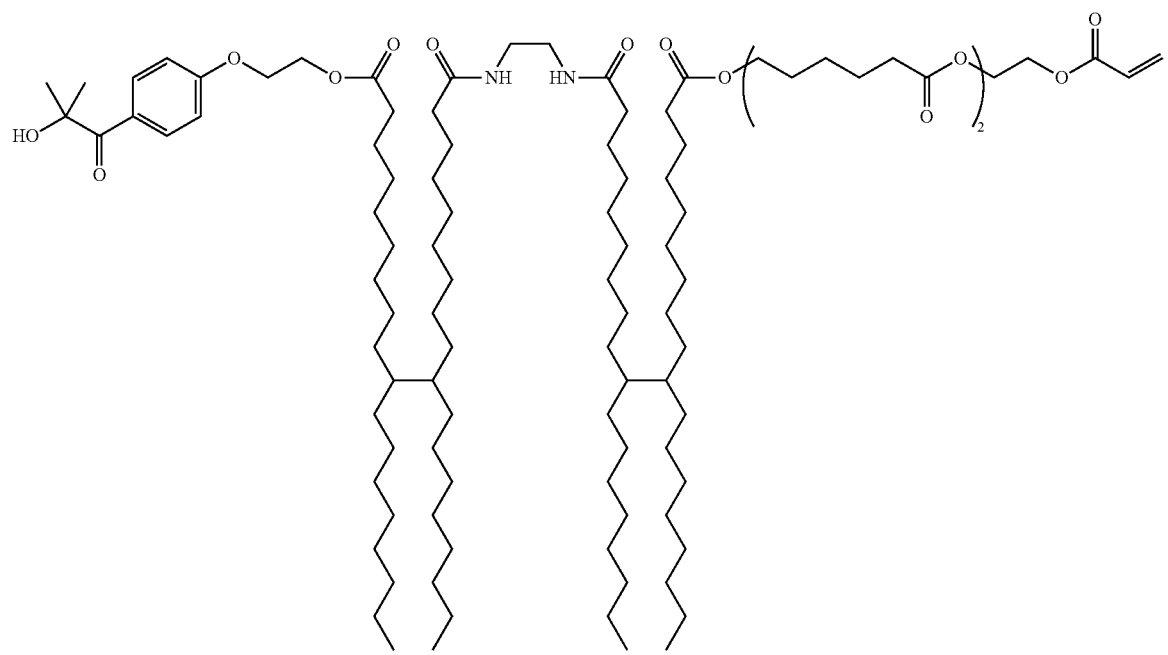
36
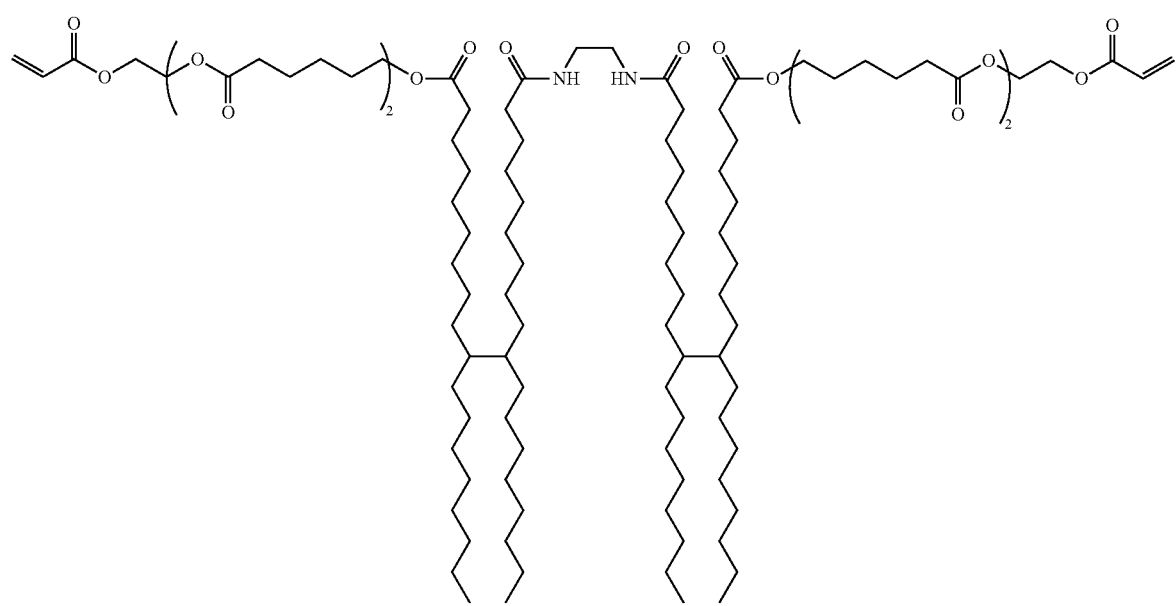

-continued

Figure 2:
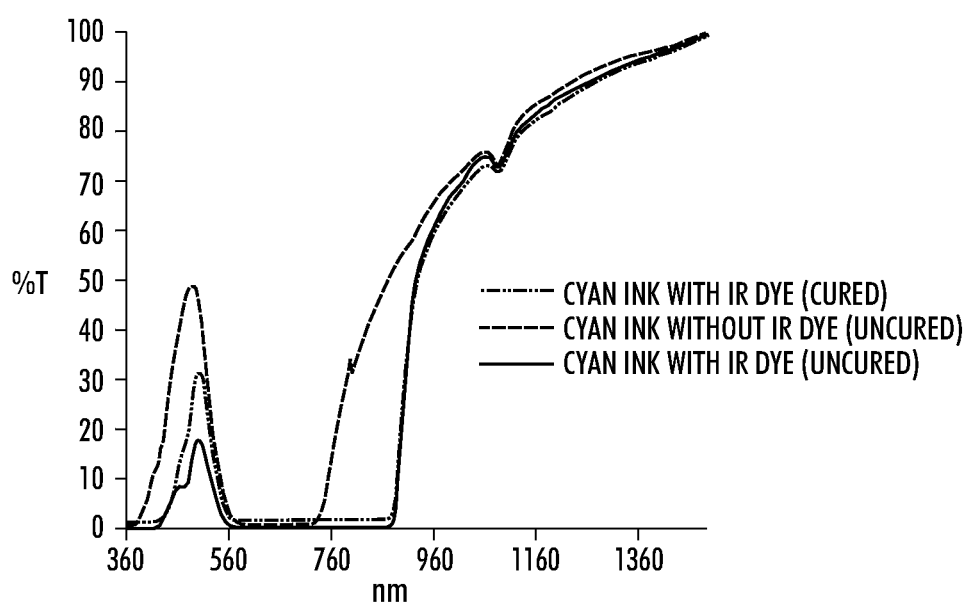
FIG. 2 illustrates the UV-Visible transmission spectra of a cyan infrared-absorbing radiation-curable ink as disclosed herein before and after curing and, for comparison purposes, a cyan radiation-curable ink containing no infrared-absorbing taggant before curing.

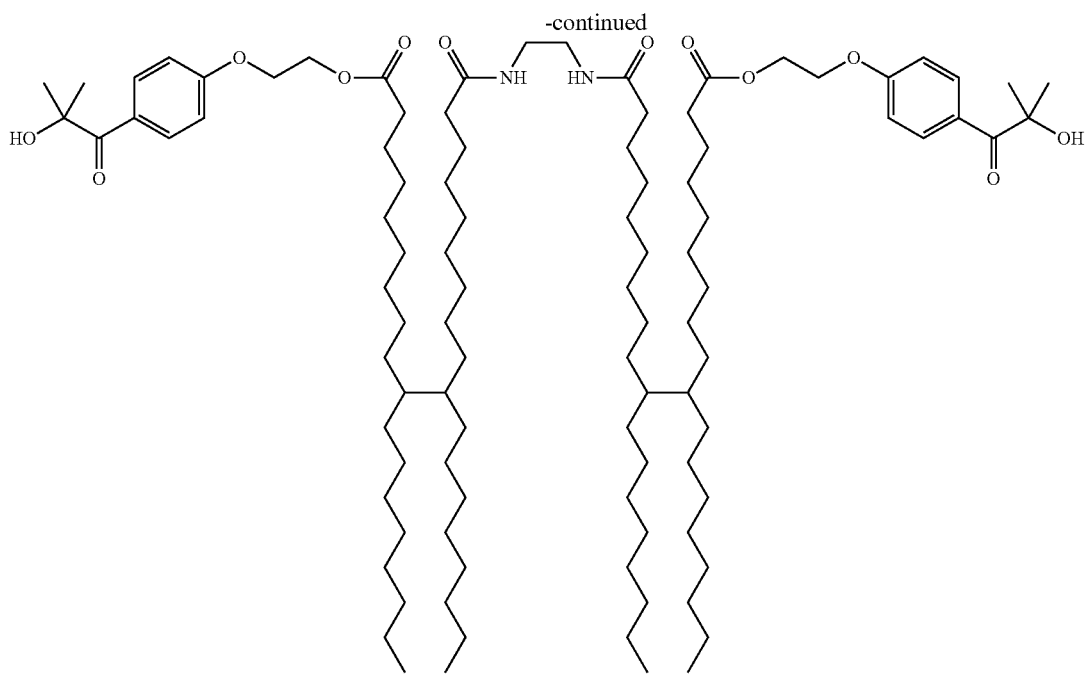

prepared as disclosed in U.S. application Ser. No. 12/765,148, filed Apr. 22, 2010. The dye and ink carrier mixture was heated and stirred for 30 minutes at 85° C. Samples were prepared and UV-visible spectra recorded by the method described in Example I both before and after curing. FIG. 2 shows transmission spectra of the cyan ink with and, for comparison purposes, the same cyan ink without, the IR-absorbing dye taggant prior to curing. To facilitate comparison, the spectra were normalized. The cyan ink itself (without the IR-absorbing taggant) had very little absorption in the IR region of interest (from about 750 nm to about 900 nm). The cyan ink with the IR-absorbing taggant had exceptionally high absorption in this region: transmission was practically zero. The distinctive absorption property of the ink containing the IR-absorbing taggant in the IR region of the spectrum demonstrates the possibility of authenticating this ink when compared with a standard ink containing no taggant. Cyan ink is the most challenging color ink in this respect because it has the highest maximum wavelength absorption among cyan, magenta, and yellow colors. As a result, all the colors and combination of these colors (CMY) are expected to work with the IR-absorbing taggant additive since they have no absorption in the IR range of the spectrum.

The ink samples were then cured using a 600 W Fusions Lighthammer lamp fitted with a mercury D-bulb at a belt speed of 32 ft/min. The normalized spectrum of the cured cyan ink containing the IR-absorbing taggant is shown in FIG. 2 together with the uncured cyan ink containing the IR-absorbing taggant. The strong absorption of the IR-absorbing taggant in the IR region of the spectrum was retained (% T is essentially zero and there was essentially no significant change of the spectrum after curing). This result demonstrates that an ink or a print made with this specialty ink can be authenticated because of its distinctive absorption in the IR region after curing.

EXAMPLE III

A radiation curable phase change ink is prepared as described in Ink Example 1 of U.S. Pat. No. 7,754,779, the disclosure of which is totally incorporated herein by reference, by admixing 8.58 g propoxylated neopentyl glycol diacrylate (Sartomer SR 9003), 1.65 g amine modified polyether acrylate (BASF PO 83 F), 0.55 g 2-benzyl-2-dimethylamino-1-(4-morpholinophenyl)-butanone-1 (Ciba IRGACURE 369), and, instead of the red dye, 0.22 g of ADS815EI, available from American Dye Source, is substituted. It is believed that an infrared-absorbing radiation-curable ink will be obtained that exhibits high absorption in the range of from about 750 nm to about 900 nm. Subsequent to curing by exposure to ultraviolet light using a 600 W Fusions Lighthammer lamp fitted with a mercury D-bulb at a belt speed of 32 ft/min, it is believed that strong absorption of the IR-absorbing taggant in the IR region of the spectrum will be retained, thereby enabling authentication of the print source.

EXAMPLE IV

A radiation curable phase change ink is prepared as described in Ink Example A of U.S. Pat. No. 7,714,040, the disclosure of which is totally incorporated herein by reference, containing 6.32% of a compound of the formula

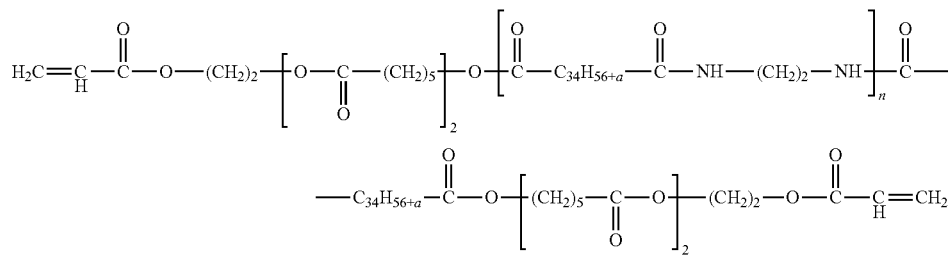

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and n is 1, including (but not limited to) isomers of the formula

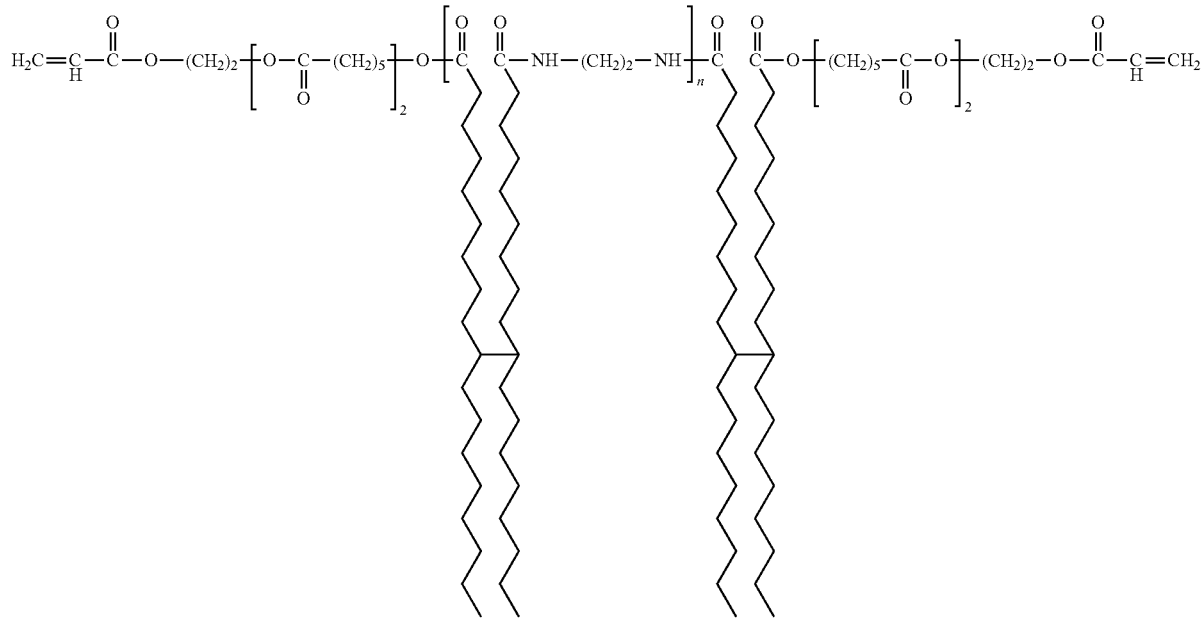

wherein n=1, 2% of isopropyl-9H-thioxanthen-9-one (ITX, obtained from Ciba Specialty Chemicals, Tarrytown, N.Y.), 3% of α-amino ketone (IRGACURE 379, available from Ciba Specialty Chemicals), 3% of 1-[4-2-hydroxyethoxy-phenyl]-2-hydroxy-2-methyl-1-propane-1-one (photoinitiator; IRGACURE 2959, available from Ciba Specialty Chemicals), 0.2% of IRGASTAB UV10 (photoinitiator; available from Ciba Specialty Chemicals), 77.98% of propoxylated neopentyl glycol diacrylate (SR9003, available from Sartomer Co. Inc.), and, instead of the 7.5% of blue pigment dispersion, 7.5% of ADS815EI, available from American Dye Source, is substituted. It is believed that an infrared-absorbing radiation-curable ink will be obtained that exhibits high absorption in the range of from about 750 nm to about 900 nm. Subsequent to curing by exposure to ultraviolet light using a 600 W Fusions Lighthammer lamp fitted with a mercury D-bulb at a belt speed of 32 ft/min, it is believed that strong absorption of the IR-absorbing taggant in the IR region of the spectrum will be retained, thereby enabling authentication of the print source.

EXAMPLE V

The processes of Examples I through IV are repeated except that instead of ADS815EI, a corresponding amount of ADS775MI, available from American Dye Source, is used. It is believed that similar results will be observed.

EXAMPLE VI

The processes of Examples I through IV are repeated except that instead of ADS815EI, a corresponding amount of ADS775MP, available from American Dye Source, is used. It is believed that similar results will be observed.

EXAMPLE VII

The processes of Examples I through IV are repeated except that instead of ADS815EI, a corresponding amount of ADS775PI, available from American Dye Source, is used. It is believed that similar results will be observed.

EXAMPLE VIII

The processes of Examples I through IV are repeated except that instead of ADS815EI, a corresponding amount of ADS775PP, available from American Dye Source, is used. It is believed that similar results will be observed.

EXAMPLE IX

The processes of Examples I through IV are repeated except that instead of ADS815EI, a corresponding amount of ADS780HO, available from American Dye Source, is used. It is believed that similar results will be observed.

EXAMPLE X

The processes of Examples I through IV are repeated except that instead of ADS815EI, a corresponding amount of ADS798SM, available from American Dye Source, is used. It is believed that similar results will be observed.

EXAMPLE XI

The processes of Examples I through IV are repeated except that instead of ADS815EI, a corresponding amount of ADS800AT, available from American Dye Source, is used. It is believed that similar results will be observed.

EXAMPLE XII

The processes of Examples I through IV are repeated except that instead of ADS815EI, a corresponding amount of ADS830AT, available from American Dye Source, is used. It is believed that similar results will be observed.

EXAMPLE XIII

The processes of Examples I through IV are repeated except that instead of ADS815EI, a corresponding amount of ADS900AF, available from American Dye Source, is used. It is believed that similar results will be observed.

EXAMPLE XIV

The processes of Examples I through IV are repeated except that instead of ADS815EI, a corresponding amount of ADS1065A, available from American Dye Source, is used. It is believed that similar results will be observed.

EXAMPLE XV

The processes of Examples I through IV are repeated except that instead of ADS815EI, a corresponding amount of ADS845MC, available from American Dye Source, is used. It is believed that similar results will be observed.

EXAMPLE XVI

The processes of Examples I through IV are repeated except that instead of ADS815EI, a corresponding amount of ADS870MC, available from American Dye Source, is used. It is believed that similar results will be observed.

EXAMPLE XVII

The processes of Examples I through IV are repeated except that instead of ADS815EI, a corresponding amount of ADS890MC, available from American Dye Source, is used. It is believed that similar results will be observed.

EXAMPLE XVIII

The processes of Examples I through IV are repeated except that instead of ADS815EI, a corresponding amount of ADS920MC, available from American Dye Source, is used. It is believed that similar results will be observed.

EXAMPLE XIX

The processes of Examples I through IV are repeated except that instead of ADS815EI, a corresponding amount of ADS780WS, available from American Dye Source, is used. It is believed that similar results will be observed.

EXAMPLE XX

The processes of Examples I through IV are repeated except that instead of ADS815EI, a corresponding amount of ADS795WS, available from American Dye Source, is used. It is believed that similar results will be observed.

EXAMPLE XXI

The processes of Examples I through IV are repeated except that instead of ADS815EI, a corresponding amount of ADS830WS, available from American Dye Source, is used. It is believed that similar results will be observed.

EXAMPLE XXII

The processes of Examples I through IV are repeated except that instead of ADS815EI, a corresponding amount of ADS832WS, available from American Dye Source, is used. It is believed that similar results will be observed.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:
1. An ink composition comprising:
 (a) a phase change ink carrier which comprises at least one curable monomer, oligomer, or prepolymer;
 (b) an initiator;
 (c) an infrared-absorbing taggant; and
 (d) an optional colorant,
 said ink being curable upon exposure to radiation;
 said ink absorbing radiation in the infrared region;
 said infrared-absorbing taggant being capable of surviving the radiation-curing step essentially unaltered.
2. An ink according to claim 1 further comprising a gellant.
3. An ink according to claim 1 wherein the ink is curable upon exposure to ultraviolet radiation.
4. An ink according to claim 1 wherein the infrared-absorbing taggant is of the formula

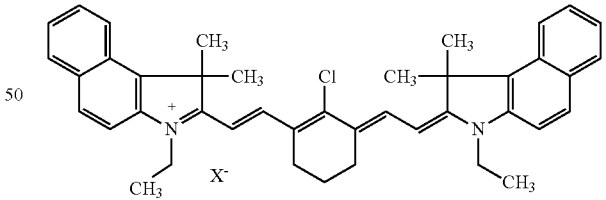

wherein X is an anion,

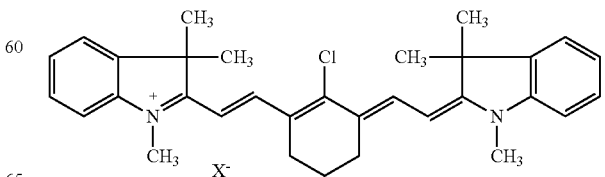

wherein X is an anion,

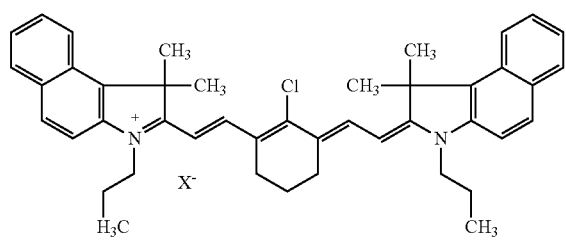
wherein X is an anion,
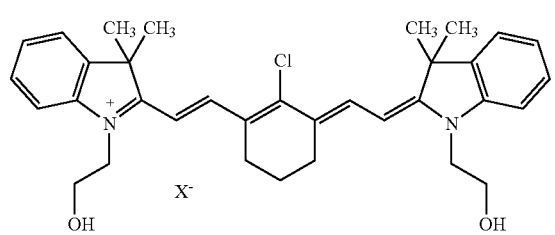
wherein X is an anion,
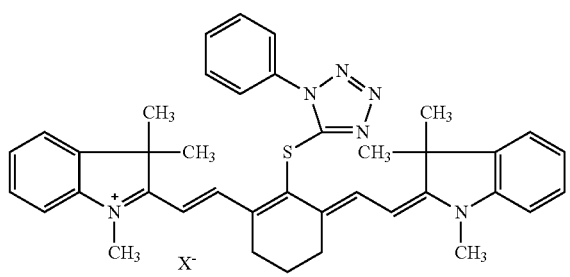
wherein X is an anion,
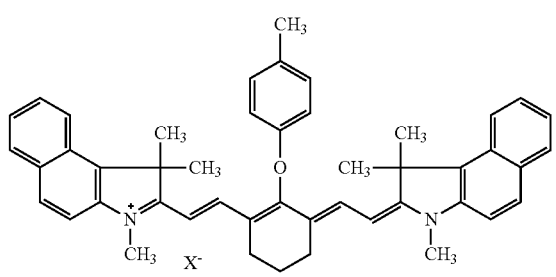
wherein X is an anion,
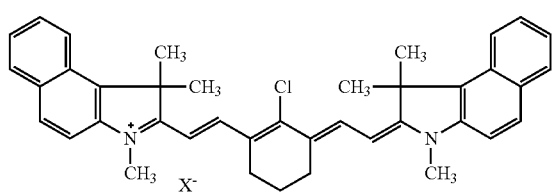
wherein X is an anion,
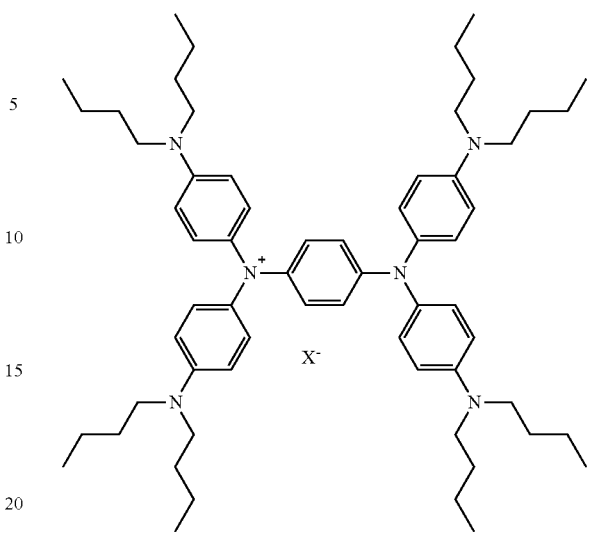
wherein X is an anion,
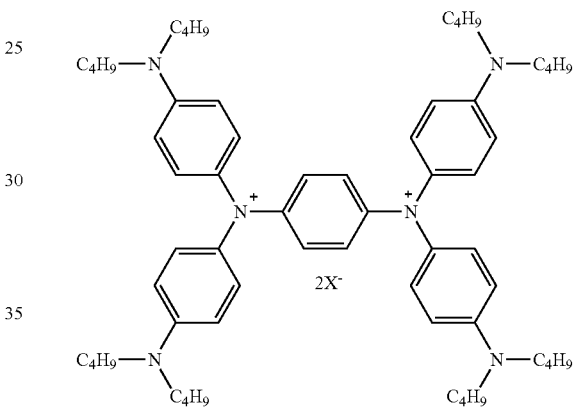
wherein X is an anion,
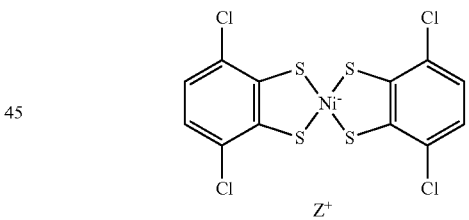
wherein Z is a cation,
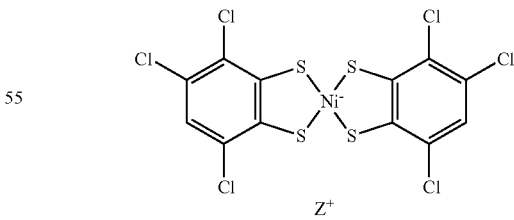
wherein Z is a cation,
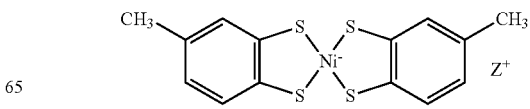
wherein Z is a cation,

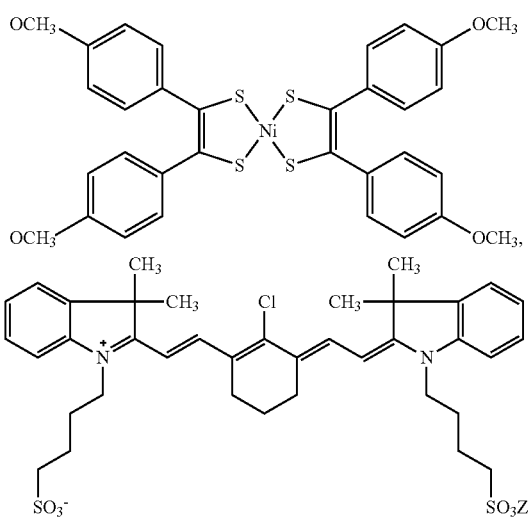

wherein Z is a cation,

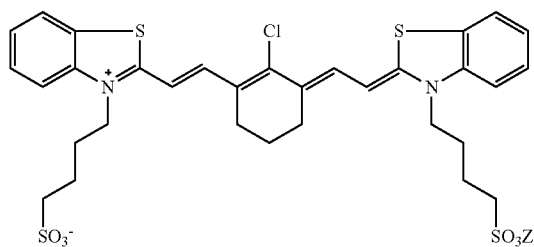

wherein Z is a cation,

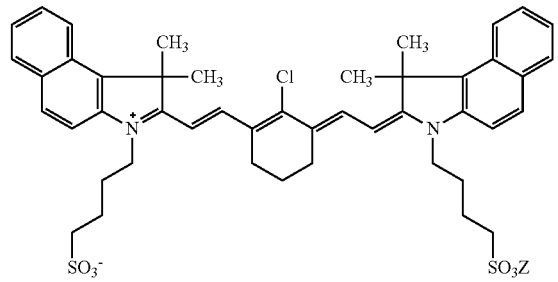

wherein Z is a cation,

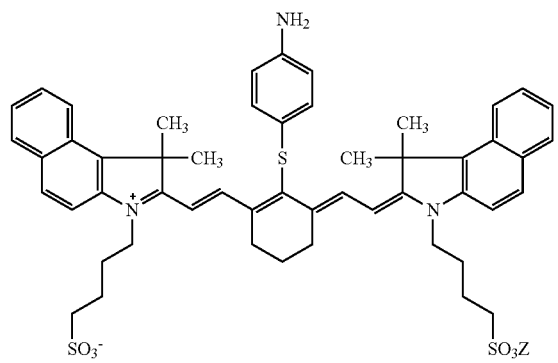

wherein Z is a cation, or mixtures thereof.

5. An ink according to claim 1 wherein the infrared-absorbing taggant is 2-[2-[2-chloro-3-[2-(1,3-dihydro-3,3-dimethyl-1-ethyl-2H-benz[e]indol-2-ylidene)ethylidene]-1-cyclohexen-1-yl]-ethenyl]-3,3-dimethyl-1-ethyl-1H-benz[e] indolium iodide, 2-[2-[2-chloro-3-[(1,3-dihydro-1,3,3-trimethyl-2H-indol-2-ylidene)-ethylidene]-1-cyclohexen-1-yl]ethenyl]-1,3,3-trimethylindolium iodide], 2-[2-[2-chloro-3-[(1,3-dihydro-1,3,3-trimethyl-2H-indol-2-ylidene)ethylidene]-1-cyclohexen-1-yl]-ethenyl]-1,3,3-trimethyl-1H-indolium perchlorate, 2-[2-[2-chloro-3-[(1,3-dihydro-3,3-dimethyl-1-propyl-2Hindol-2-ylidene)-ethylidene]-1-cyclohexen-1-yl]-ethenyl]-3,3-dimethyl-1-propylindolium iodide], 2-[2-[2-chloro-3-[(1,3-dihydro-3,3-dimethyl-1-propyl-2H-indol-2-ylidene)-ethylidene]-1-cyclohexen-1-yl]-ethenyl]-3,3-dimethyl-1-propyl-1H-indolium perchlorate, 2-[2-[2-chloro-3-[(1,3-dihydro-3,3-dimethyl-1-(2-hydroxy)-ethyl-2H-Indol-2-ylidene)ethylidene]-1-cyclohexen-1-yl]ethenyl]-3,3-dimethyl-1-(2-hydroxy)ethyl-1H-idolium perchlorate, 2-[2-[3-[2-(1,3-dihydro-1,3,3-trimethyl-2H-indol-2-ylidene)ethyli-dene]-2-(1-phenyl-1H-tetrazol-5-ylsulfanyl)-1-cyclohexen-1-yl]-ethenyl]-1,3,3-trimethyl-3H-indolium chloride, 2-[2-[2-(4-methylbenzeneoxy)-3-[2-(1,3-dihydro-1,1,3-trimethyl-2H-benz[e]-indol-2-ylidene) ethylidene]-1-cyclohexen-1-yl]-ethenyl]-1,1,3-trimethyl-1H-benz[e]indolium 4-methylbenzenesulfonate, 2-[2-[2-chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo[e]indolium-4-methylbenzenesulfonate, a compound of the formula

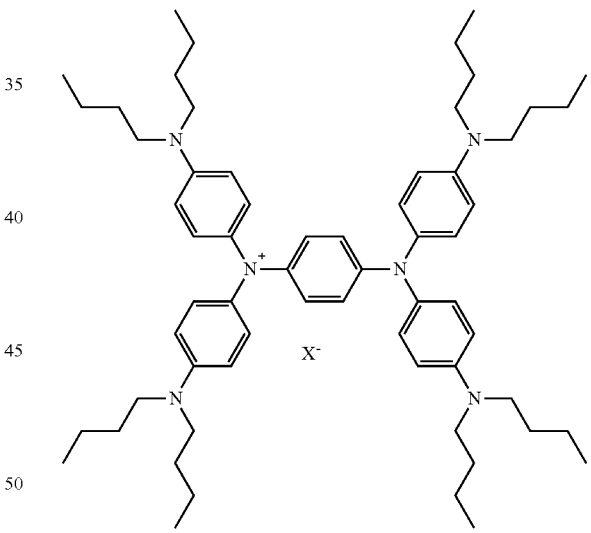

when X is SbF$_6$, N,N,N,N-tetrakis(4-dibutylaminophenyl)-p-benzoquinone bis(iminium hexafluoroantimonate), tetrabutylammonium bis(3,6-dichloro-1,2-benzene-dithiolato) nickelate, tetrabutylammonium bis(3,4,6-trichloro-1,2-benzene-dithiolato)nickelate, tetrabutylammonium bis(4-methyl-1,2-benzenedithiolato)nickelate, bis(4,4'-dimethoxydithiobenzil) nickel, 2-[2-[2-(4-methylbenzeneoxy)-3-[(1,3-dihydro-3,3-dimethyl-1-(4-sulfobutyl)-2H-benz[e]indol-2-ylidene)-ethylidene]-1-cyclohexen-1-yl]-ethenyl]-3,3-di-methyl-1-(4-sulfo-butyl)-1H-benz[e]indolium, inner salt, monosodium salt, 2-[2-[2-chloro-3-[2-(3-(4-sulfobutyl)-3H-benzthiazol-2-ylidene) ethylidene]-1-cyclo-hexen-1-yl]-ethenyl]-3-(4-sulfobutyl)

benzthiazonium, inner salt, triethylammonium salt, 2-[2-[2-chloro-3-[2-(1,3-dihydro-3,3-dimethyl-1-(4-sulfobutyl)-2H-benz[e]-indol-2-ylidene)-ethylidene]-1-cyclohexen-1-yl]-ethenyl]-3,3-dimethyl-1-(4-sulfobutyl)-1H-benz[e] indolium, inner salt, free acid, 2-[2-[2-(4-aminothiophenyl)-3-[[1,3-dihydro-1,1-dimethyl-3-(4-sulfobutyl)-2H-benz[e]-indol-2-ylidene]ethylidene]-1-cyclohexen-1-yl]ethenyl]-1,1-dimethyl-3-(4-sulfonyl)-, inner salt, sodium salt, or mixtures thereof.

6. An ink according to claim 1 wherein the infrared-absorbing taggant is 2-[2-[2-chloro-3-[2-(1,3-dihydro-3,3-dimethyl-1-ethyl-2H-benz[e]indol-2-ylidene)ethylidene]-1-cyclohexen-1-yl]-ethenyl]-3,3-dimethyl-1-ethyl-1H-benz[e] indolium iodide.

7. An ink according to claim 1 wherein the infrared-absorbing taggant is present in the ink carrier in an amount of at least about 0.1 percent by weight.

8. An ink according to claim 1 wherein the ink absorbs infrared radiation in the wavelength range of from about 730 to about 2,500 nanometers.

9. An ink according to claim 2 wherein the gellant is a curable amide.

10. An ink according to claim 2 wherein the gellant is of the formula

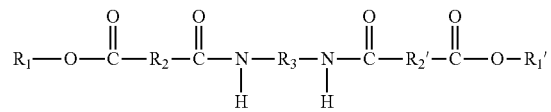

wherein $R_1$ and $R_{1'}$ can be the same or different and wherein $R_1$ and $R_{1'}$ each, independently of the other,

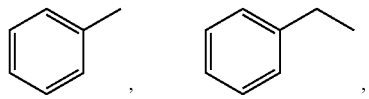

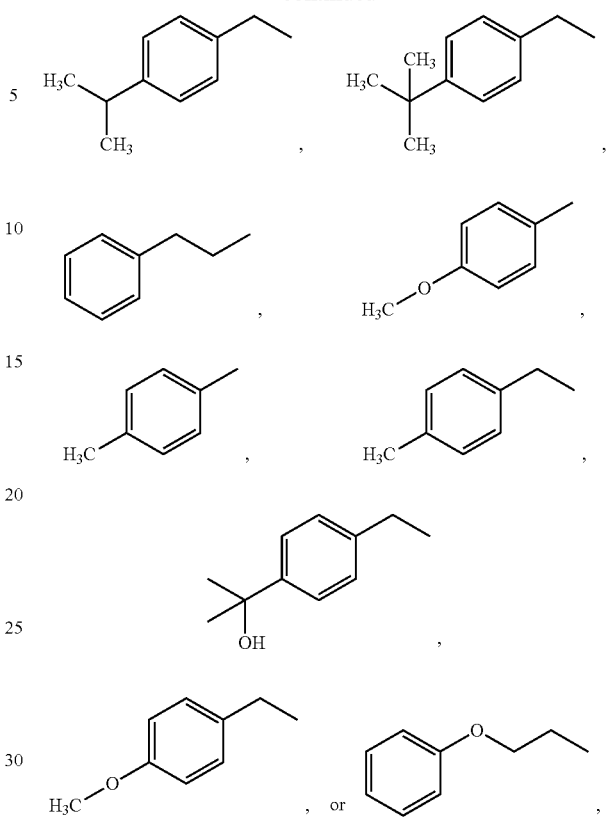

$R_2$ and $R_{2'}$ are isomers of the formula —$C_{34}H_{56+a}$— which are branched alkylene groups which may include unsaturations and cyclic groups, wherein a is an integer of 0, 1, 2, 3, 4, 5, 6, 7, 8, 9, 10, 11, or 12, and $R_3$ is —$CH_2CH_2$—.

11. An ink according to claim 2 wherein the gellant is of the formula

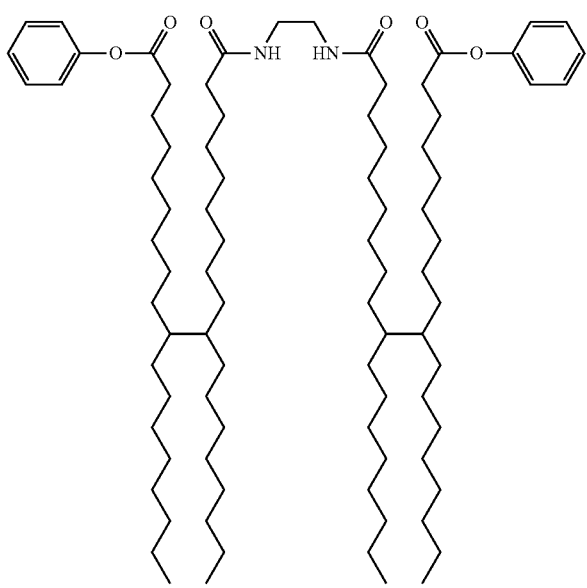

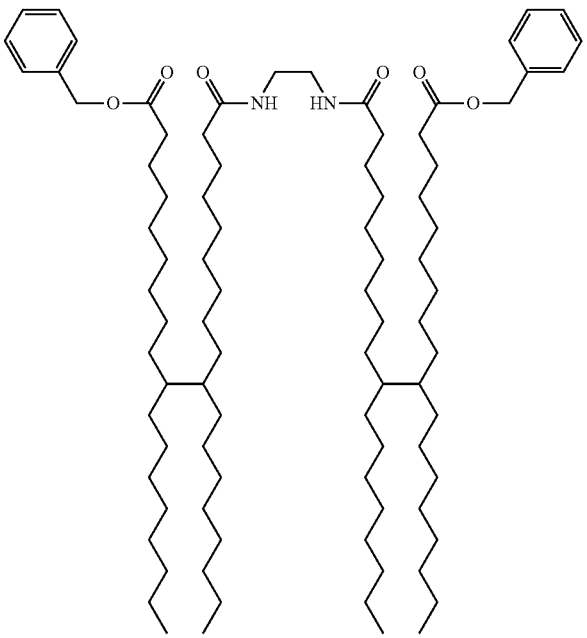

-continued
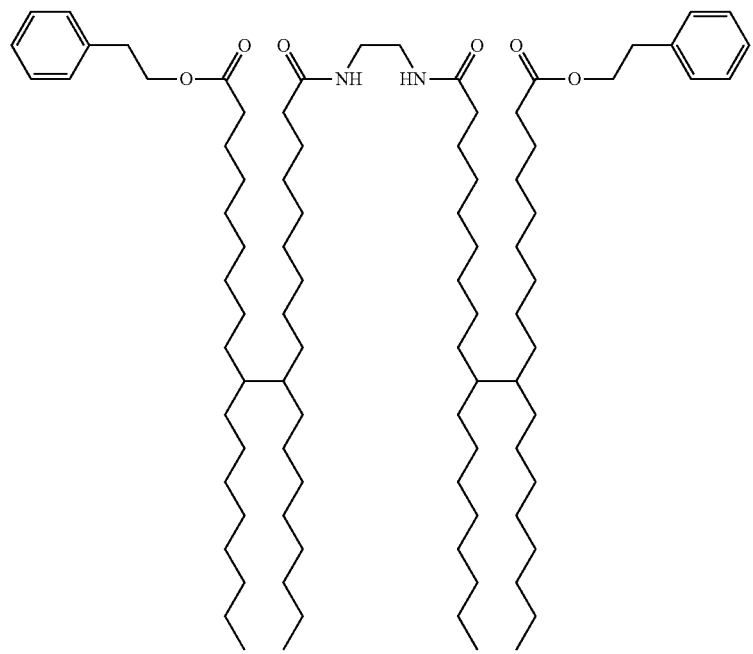
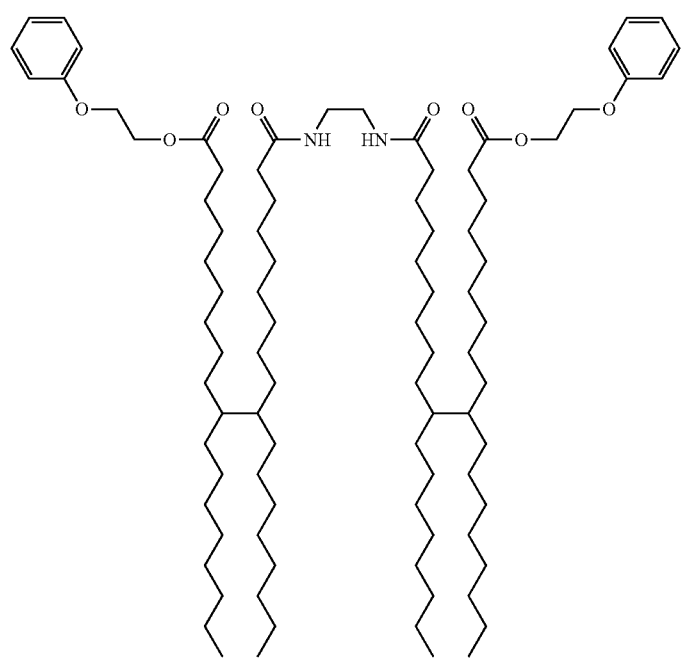

51
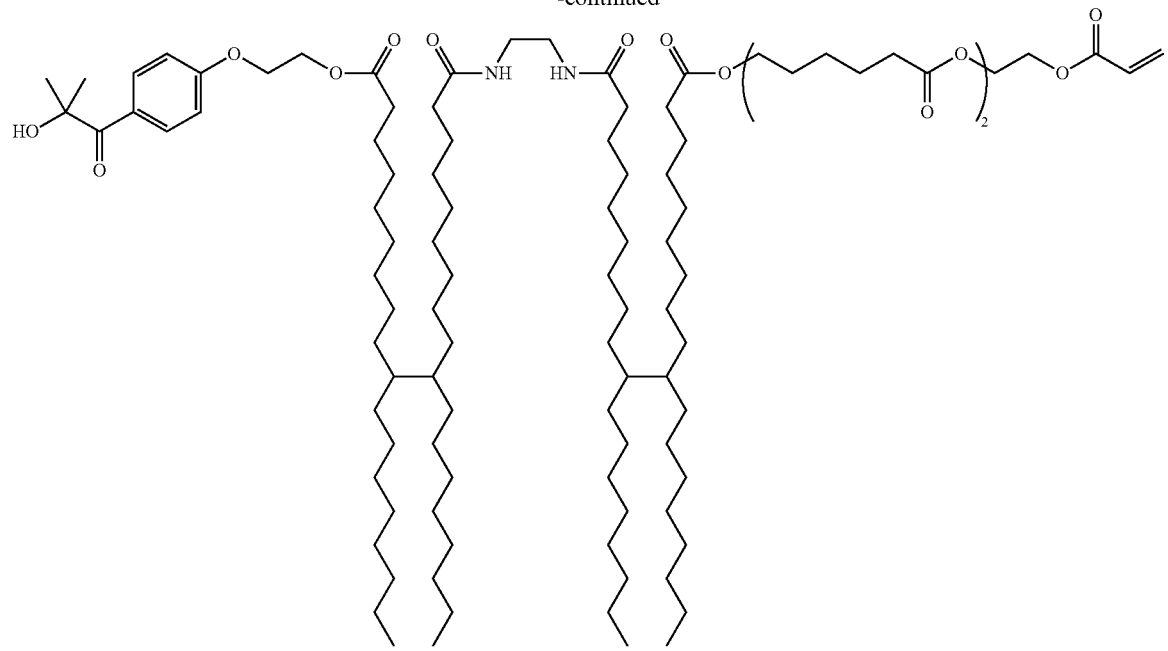
52
-continued
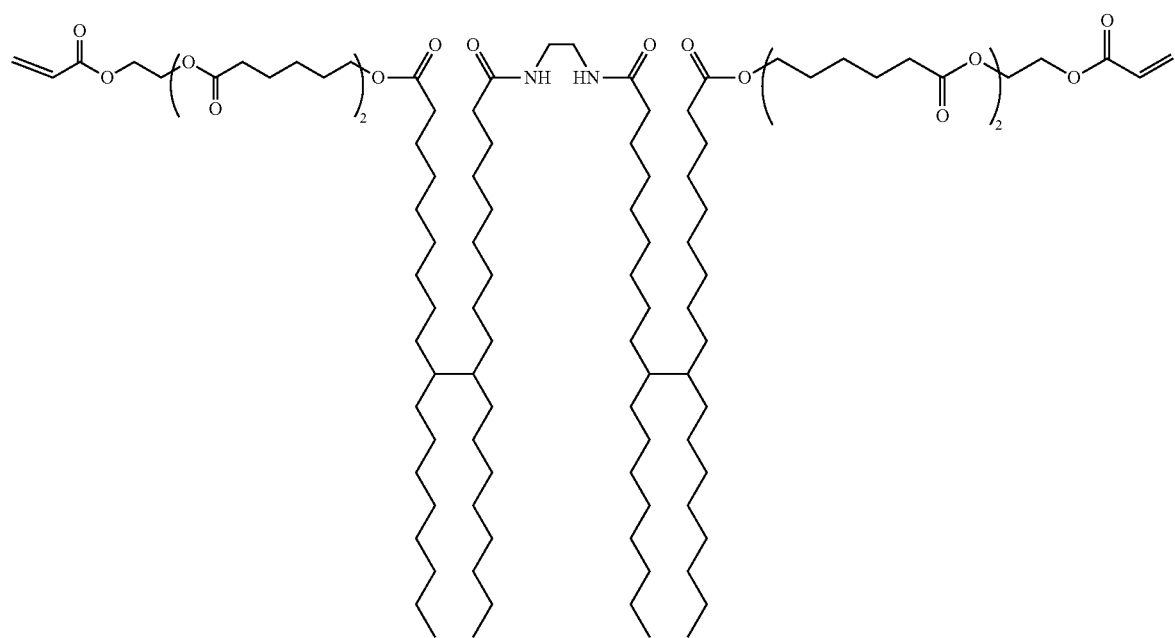

-continued

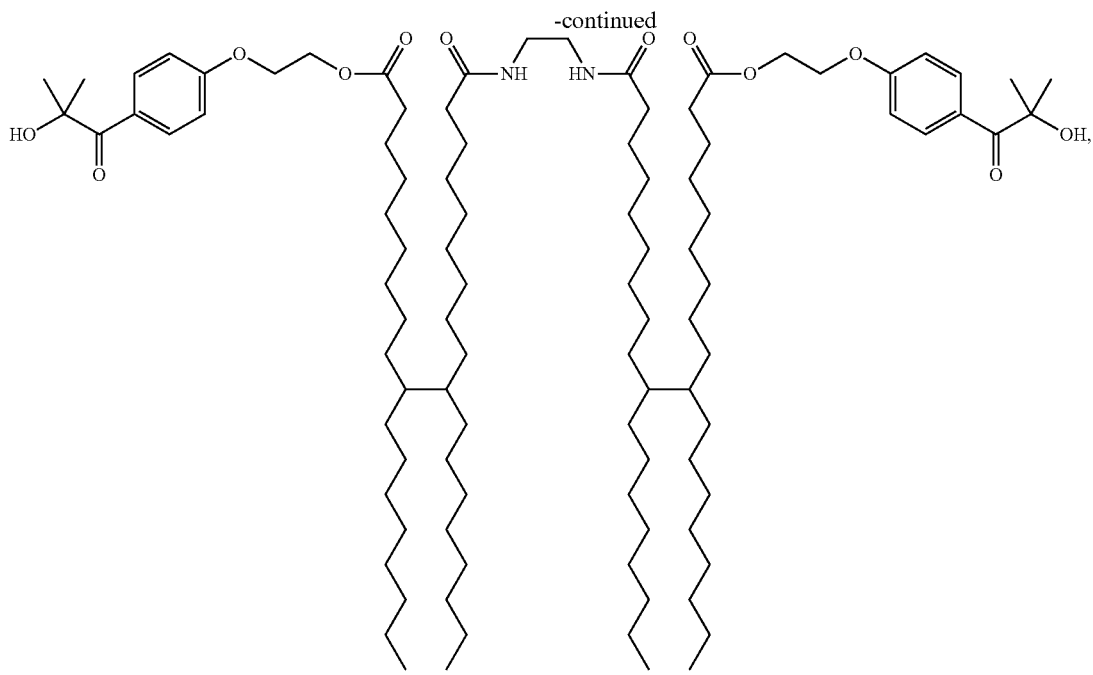

or mixtures thereof.

12. An ink according to claim 2 wherein the gellant is present in an amount of from about 5 to about 50 percent by weight of the ink carrier.

13. An ink according to claim 1 further comprising a curable wax.

14. An ink according to claim 13 wherein the curable wax comprises the reaction product of a compound of the formula $CH_3—(CH_2)_n—CH_2OH$ wherein n is an integer representing the number of repeat $CH_2$ groups with acrylic acid or methacrylic acid.

15. An ink according to claim 13 wherein the curable wax is present in the ink in an amount of from about 1 to about 40 percent by weight.

16. An ink composition comprising:
(a) a phase change ink carrier which comprises at least one curable monomer, oligomer, or prepolymer;
(b) an initiator;
(c) an infrared-absorbing taggant which is 2-[2-[2-chloro-3-[2-(1,3-dihydro-3,3-dimethyl-1-ethyl-2H-benz[e]indol-2-ylidene)ethylidene]-1-cyclohexen-1-yl]-ethenyl]-3,3-dimethyl-1-ethyl-1H-benz[e]indolium iodide, 2-[2-[2-chloro-3-[(1,3-dihydro-1,3,3-trimethyl-2H-indol-2-ylidene)-ethylidene]-1-cyclohexen-1-yl]ethenyl]-1,3,3-trimethylindolium iodide], 2-[2-[2-chloro-3-[(1,3-dihydro-1,3,3-trimethyl-2H-indol-2-ylidene)ethyli-dene]-1-cyclohexen-1-yl]-ethenyl]-1,3,3-trimethyl-1H-indolium perchlorate, 2-[2-[2-chloro-3-[(1,3-dihydro-3,3-dimethyl-1-propyl-2Hindol-2-ylidene)-ethylidene]-1-cyclohexen-1-yl]-ethenyl]-3,3-dimethyl-1-propylindolium iodide], 2-[2-[2-chloro-3-[(1,3-dihydro-3,3-dimethyl-1-propyl-2H-indol-2-ylidene)-ethylidene]-1-cyclohexen-1-yl]-ethenyl]-3,3-dimethyl-1-propyl-1H-indolium perchlorate, 2-[2-[2-chloro-3-[(1,3-dihydro-3,3-dimethyl-1-(2-hydroxy)-ethyl-2H-Indol-2-ylidene)ethylidene]-1-cyclohexen-1-yl]ethenyl]-3,3-dimethyl-1-(2-hydroxy)ethyl-1H-idolium perchlorate, 2-[2-[3-[2-(1,3-dihydro-1,3,3-trimethyl-2H-indol-2-ylidene)ethyli-dene]-2-(1-phenyl-1H-tetrazol-5-ylsulfanyl)-1-cyclohexen-1-yl]-ethenyl]-1,3,3-trimethyl-3H-indolium chloride, 2-[2-[2-(4-methylbenzeneoxy)-3-[2-(1,3-dihydro-1,1,3-trimethyl-2H-benz[e]-indol-2-ylidene)ethylidene]-1-cyclohexen-1-yl]-ethenyl]-1,1,3-trimethyl-1H-benz[e]indolium 4-methylbenzenesulfonate, 2-[2-[2-chloro-3-[2-(1,3-dihydro-1,1,3-trimethyl-2H-benzo[e]-indol-2-ylidene)-ethylidene]-1-cyclohexen-1-yl]-ethenyl]-1,1,3-trimethyl-1H-benzo [e]indolium-4-methylbenzenesulfonate, a compound of the formula

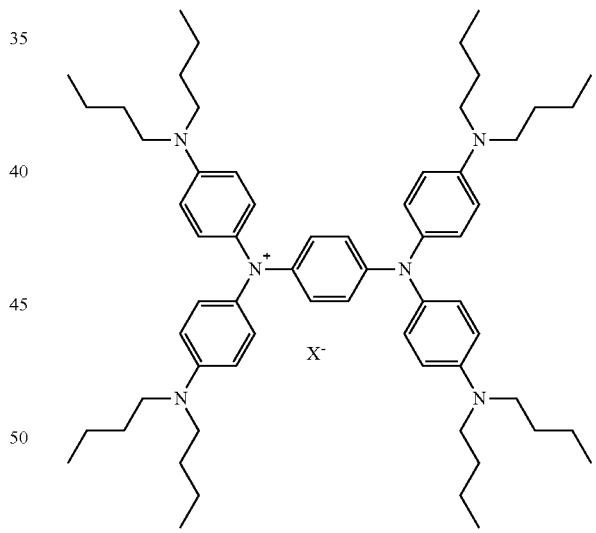

when X is $SbF_6$, N,N,N,N-tetrakis(4-dibutylaminophenyl)-p-benzoquinone bis(iminium hexafluoroantimonate), tetrabutylammonium bis(3,6-dichloro-1,2-benzene-dithiolato) nickelate, tetrabutylammonium bis(3,4,6-trichloro-1,2-benzene-dithiolato)nickelate, tetrabutylammonium bis(4-methyl-1,2-benzenedithiolato)nickel, bis(4,4'-dimethoxydithiobenzil) nickel, 2-[2-[2-(4-methylbenzeneoxy)-3-[(1,3-dihydro-3,3-dimethyl-1-(4-sulfobutyl)-2H-benz[e]indol-2-ylidene)-ethylidene]-1-cyclohexen-1-yl]-ethenyl]-3,3-di-methyl-1-(4-sulfo-butyl)-1H-benz[e]indolium, inner salt, monosodium salt, 2-[2-[2-chloro-3-[2-(3-(4-sulfobutyl)-3H-benzthiazol-2-ylidene) ethylidene]-1-cyclo-hexen-1-yl]-ethenyl]-3-(4-sulfobutyl) benzthiazonium, inner salt, triethylammonium salt, 2-[2-[2- chloro-3-[2-(1,3-dihydro-3,3-dimethyl-1-(4-sulfobutyl)-2H-benz[e]-indol-2-ylidene)-ethylidene]-1-cyclohexen-1-yl]-ethenyl]-3,3-dimethyl-1-(4-sulfobutyl)-1H-benz[e] indolium, inner salt, free acid, 2-[2-[2-(4-aminothiophenyl)-3-[[1,3-dihydro-1,1-dimethyl-3-(4-sulfobutyl)-2H-benz[e]-indol-2-ylidene]ethylidene]-1-cyclohexen-1-yl]ethenyl]-1,1-dimethyl-3-(4-sulfonyl)-, inner salt, sodium salt, or mixtures thereof; and (d) an optional colorant, said ink being curable upon exposure to ultraviolet radiation;

said ink absorbing radiation in the infrared region of from about 730 to about 2,500 nanometers;

said infrared-absorbing taggant being capable of surviving the radiation-curing step essentially unaltered.

17. A process which comprises:
(1) incorporating into an ink jet printing apparatus a radiation curable solid ink composition comprising:
(a) a phase change ink carrier which comprises at least one curable monomer, oligomer, or prepolymer;
(b) an initiator;
(c) an infrared-absorbing taggant; and
(d) an optional colorant,
said ink being curable upon exposure to radiation;
said ink absorbing radiation in the infrared region;
(2) melting the ink;
(3) causing droplets of the melted ink to be ejected in an imagewise pattern onto a substrate; and
(4) exposing the imagewise pattern to ultraviolet radiation;
wherein saidsaid infrared-absorbing taggant survives the step of exposure to ultraviolet-radiation essentially unaltered.

18. A process according to claim 17 wherein the substrate is a final recording sheet and droplets of the melted ink are ejected in an imagewise pattern directly onto the final recording sheet.

19. A process according to claim 17 wherein the substrate is an intermediate transfer member and droplets of the melted ink are ejected in an imagewise pattern onto the intermediate transfer member followed by transfer of the imagewise pattern from the intermediate transfer member to a final recording sheet.

20. A process according to claim 19 wherein the imagewise pattern is exposed to ultraviolet radiation on the final recording sheet.

21. An ink according to claim 1 wherein the infrared-absorbing taggant is of the formula

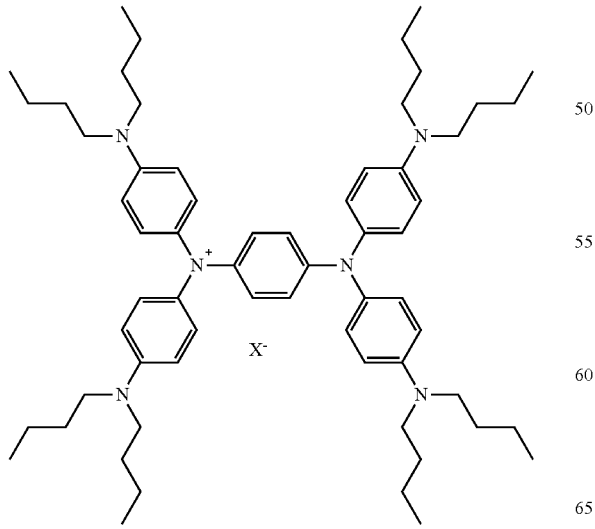

wherein X is an anion,

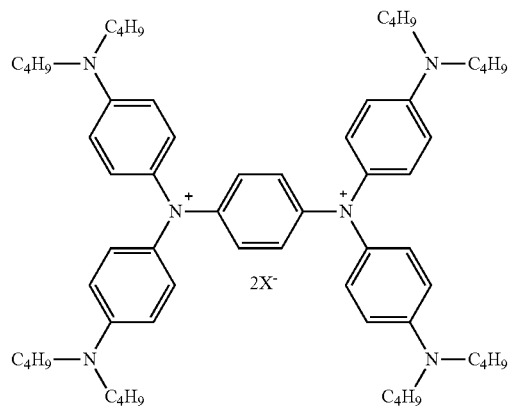

wherein X is an anion,

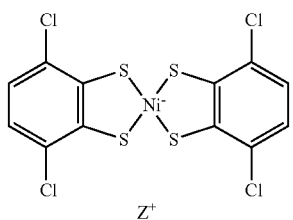

wherein Z is a cation,

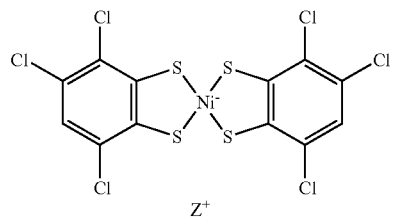

wherein Z is a cation,

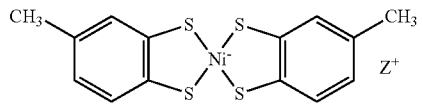

wherein Z is a cation,

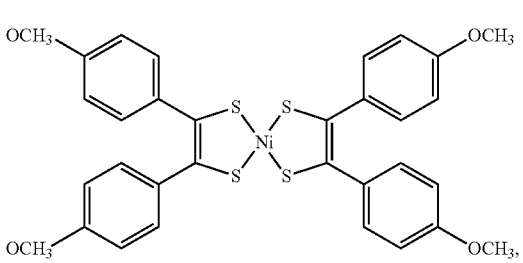

or mixtures thereof.

22. A process according to claim 17 wherein the infrared-absorbing taggant is of the formula
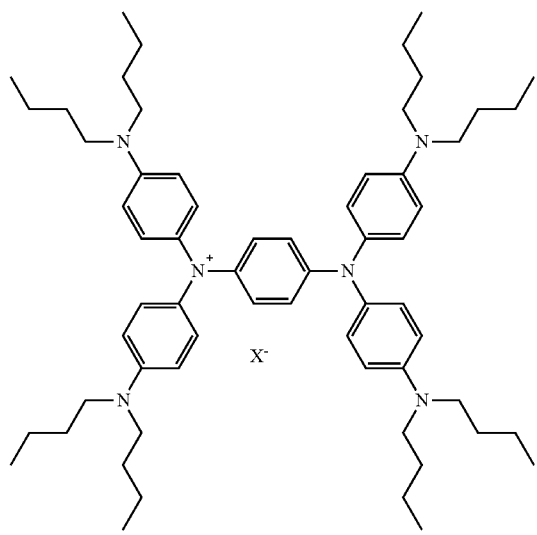
wherein X is an anion,
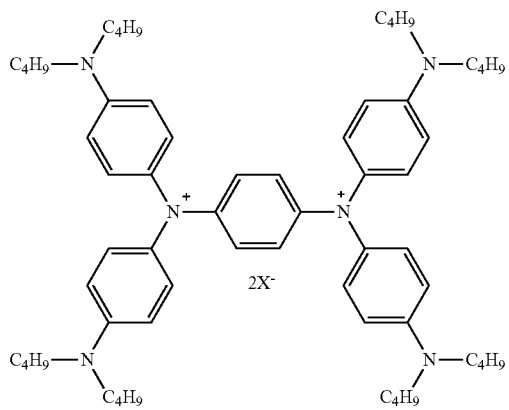
wherein X is an anion,
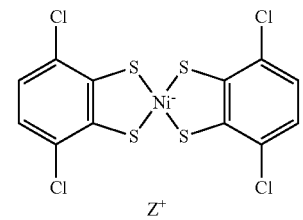
wherein Z is a cation,
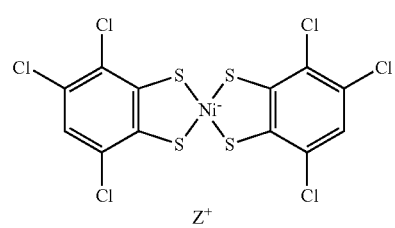
wherein Z is a cation,
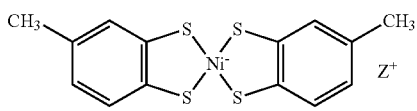
wherein Z is a cation,
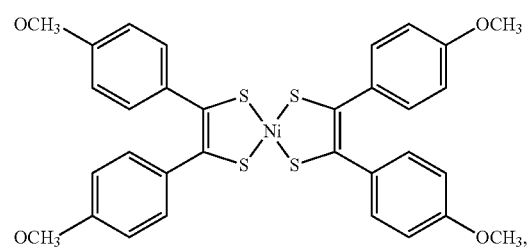
or mixtures thereof.
* * * * *